United States Patent
Tsukazaki

(10) Patent No.: US 7,762,110 B2
(45) Date of Patent: Jul. 27, 2010

(54) STEERING LOCK UNIT

(75) Inventor: Manabu Tsukazaki, Hamamatsu (JP)

(73) Assignee: U-Shin, Ltd., Tokyo (JP)

( * ) Notice: Subject to any disclaimer, the term of this patent is extended or adjusted under 35 U.S.C. 154(b) by 400 days.

(21) Appl. No.: 11/905,596

(22) Filed: Oct. 2, 2007

(65) Prior Publication Data

US 2008/0087056 A1 Apr. 17, 2008

(30) Foreign Application Priority Data

Oct. 6, 2006 (JP) ............................. 2006-274893
Oct. 20, 2006 (JP) ............................. 2006-286091

(51) Int. Cl.
*B60R 25/02* (2006.01)

(52) U.S. Cl. ......................................... 70/186; 70/252

(58) Field of Classification Search ............ 70/182–186, 70/252
See application file for complete search history.

(56) References Cited

U.S. PATENT DOCUMENTS

| | | | | |
|---|---|---|---|---|
| 2,229,525 | A * | 1/1941 | Sandberg | 70/252 |
| 2,831,073 | A * | 4/1958 | Mason | 200/6 R |
| 4,031,345 | A * | 6/1977 | Garcia | 200/455 |
| 4,758,724 | A * | 7/1988 | Osika | 200/315 |
| 5,454,238 | A * | 10/1995 | Ross et al. | 70/186 |
| 5,595,079 | A * | 1/1997 | Myers | 70/233 |
| 5,672,855 | A * | 9/1997 | Uchiyama et al. | 200/61.3 |
| 6,354,118 | B1 * | 3/2002 | Frick et al. | 70/186 |
| 6,539,756 | B2 * | 4/2003 | Bartels et al. | 70/186 |
| 6,734,376 | B2 * | 5/2004 | Ichida et al. | 200/4 |
| 6,755,058 | B2 * | 6/2004 | Zillmann | 70/252 |
| 7,260,963 | B2 * | 8/2007 | Suzuki et al. | 70/186 |
| 7,604,254 | B2 * | 10/2009 | Pieronczyk et al. | 280/775 |
| 2001/0025516 | A1 * | 10/2001 | Starken | 70/186 |
| 2002/0116962 | A1 * | 8/2002 | Zillmann | 70/186 |
| 2005/0268676 | A1 * | 12/2005 | Fukushima | 70/186 |
| 2006/0005588 | A1 * | 1/2006 | Okuno | 70/186 |
| 2006/0169011 | A1 * | 8/2006 | Limburg | 70/186 |

(Continued)

FOREIGN PATENT DOCUMENTS

JP 2004-106750 4/2004

(Continued)

*Primary Examiner*—Lloyd A Gall
(74) *Attorney, Agent, or Firm*—Wenderoth, Lind & Ponack, L.L.P.

(57) ABSTRACT

A steering lock unit in which it is possible to place priority on the operating speed or the extracting force of the lock member according to the engagement state of the lock member in the movable member. In a steering lock unit (10) including a transmission mechanism which transmits a power of an electric motor (22) to the lock shaft (30) which holds and releases engagement with a steering shaft. The transmission mechanism includes: a shaft portion (24a) which is adapted to rotate in response to operation of the electric motor (22); and a winder (26) which engages with the shaft portion (24a) and transmits the operation of the electric motor (22) to the lock shaft (30). When releasing the engagement of the lock shaft (30) with the steering shaft, the shaft portion (24a) and the winder (26) integrally rotate in a normal state, while the winder (26) moves in an axial direction with respect to the shaft portion (24a) in a case in which a pull-out force of the lock shaft, greater than a predetermined quantity, is necessary.

8 Claims, 16 Drawing Sheets

U.S. PATENT DOCUMENTS

| | | | |
|---|---|---|---|
| 2007/0006620 A1* | 1/2007 | Fukushima | 70/186 |
| 2008/0047309 A1* | 2/2008 | Okuno et al. | 70/252 |
| 2008/0098777 A1* | 5/2008 | Tanioka et al. | 70/184 |
| 2008/0178643 A1* | 7/2008 | Okuno et al. | 70/184 |
| 2009/0260408 A1* | 10/2009 | Tsukazaki | 70/183 |

FOREIGN PATENT DOCUMENTS

| | | |
|---|---|---|
| JP | 2006-15984 | 1/2006 |

* cited by examiner

Fig.1
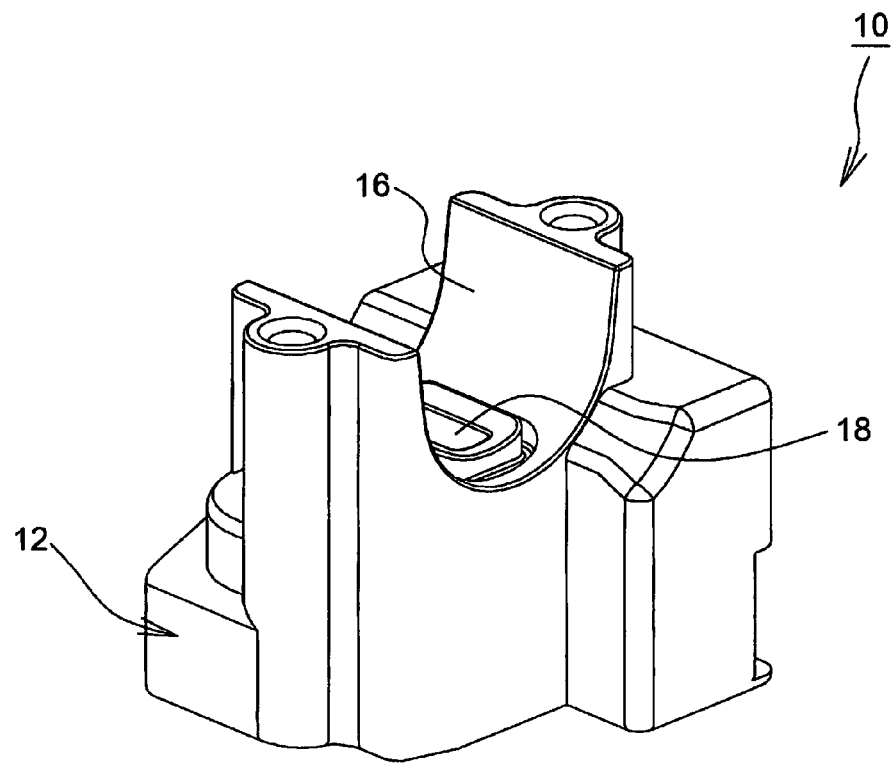
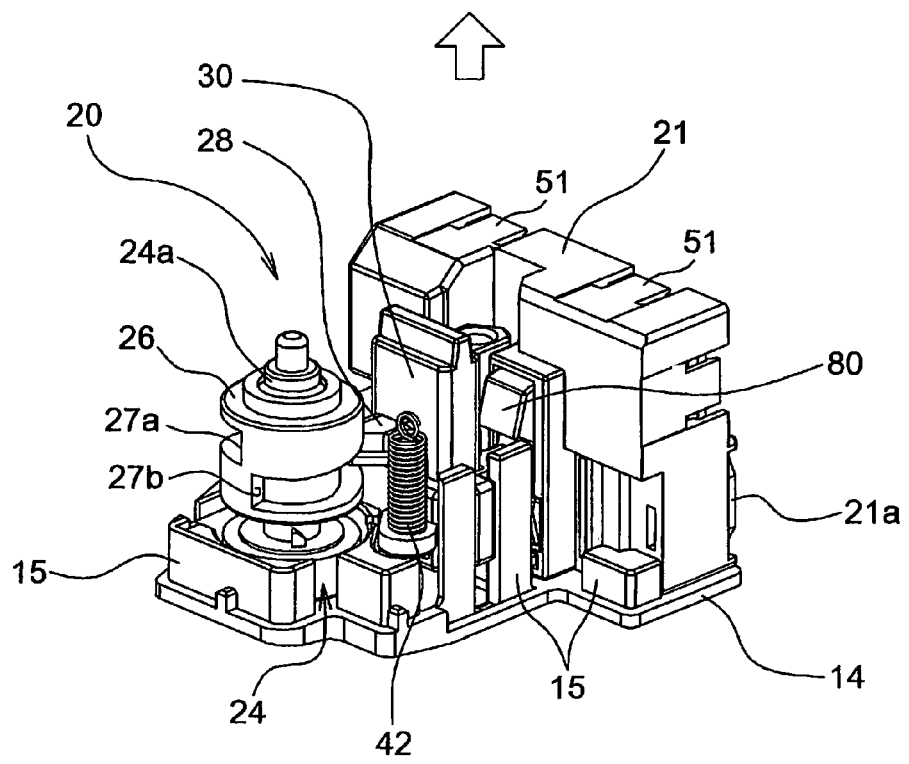

Fig.3
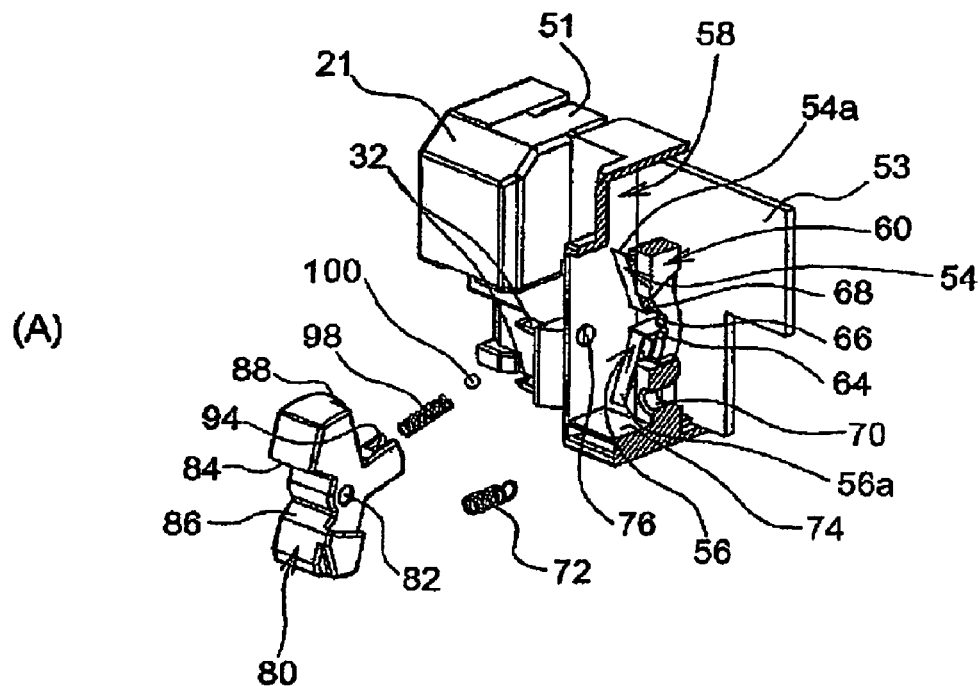
(A)
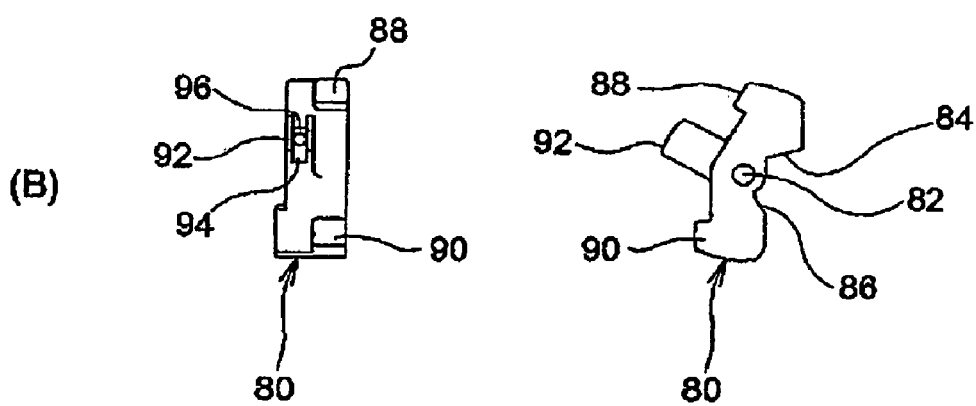
(B)

Fig.8
LOCK STATE
(A)
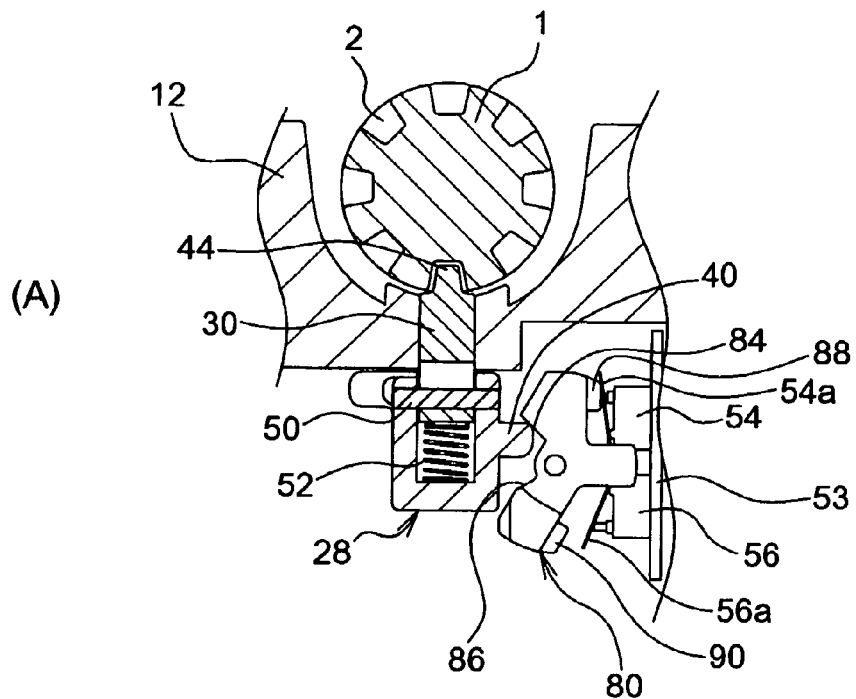
(B)
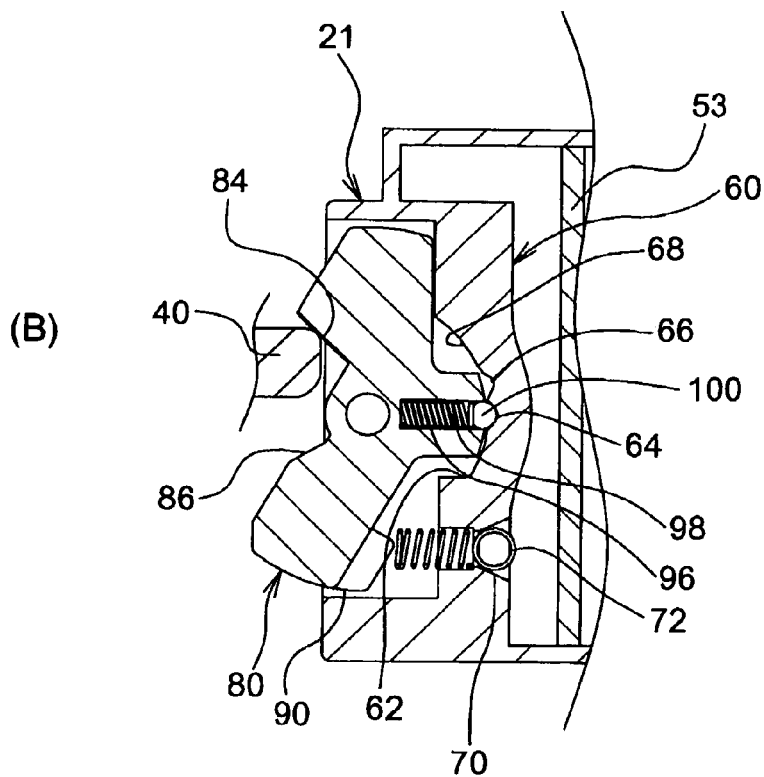

Fig.9
STATE THAT LOCK SHAFT ESCAPES
FROM ENGAGING POSITION
(A)
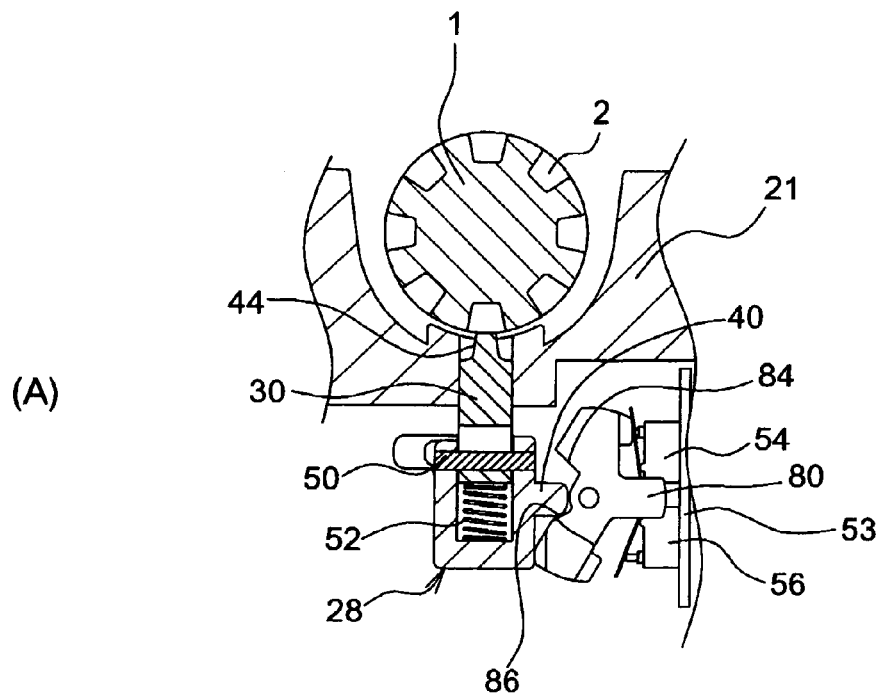
(B)
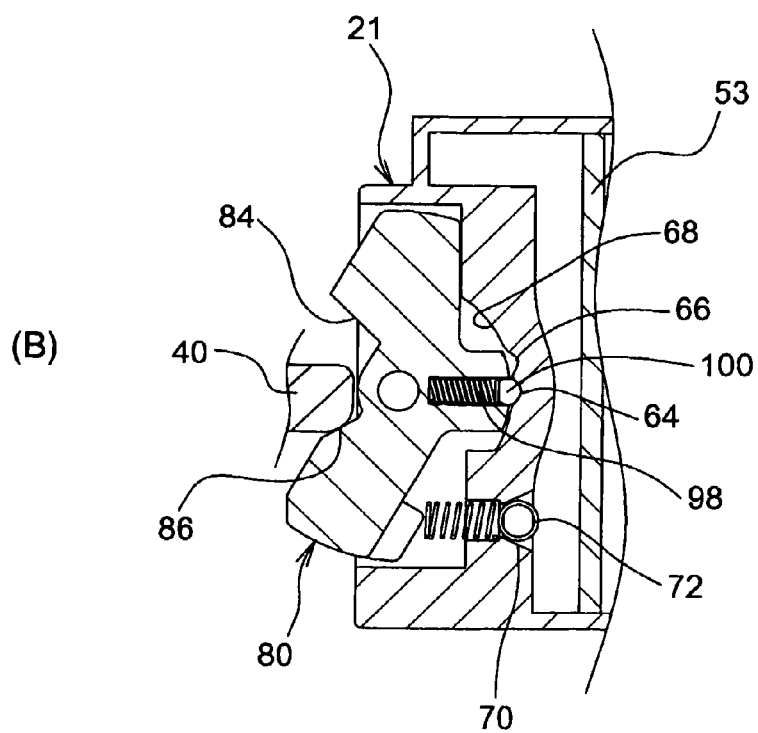

Fig. 10
STATE THAT LOCK POSITION DETECTING SWITCH TURNS OFF
(A)
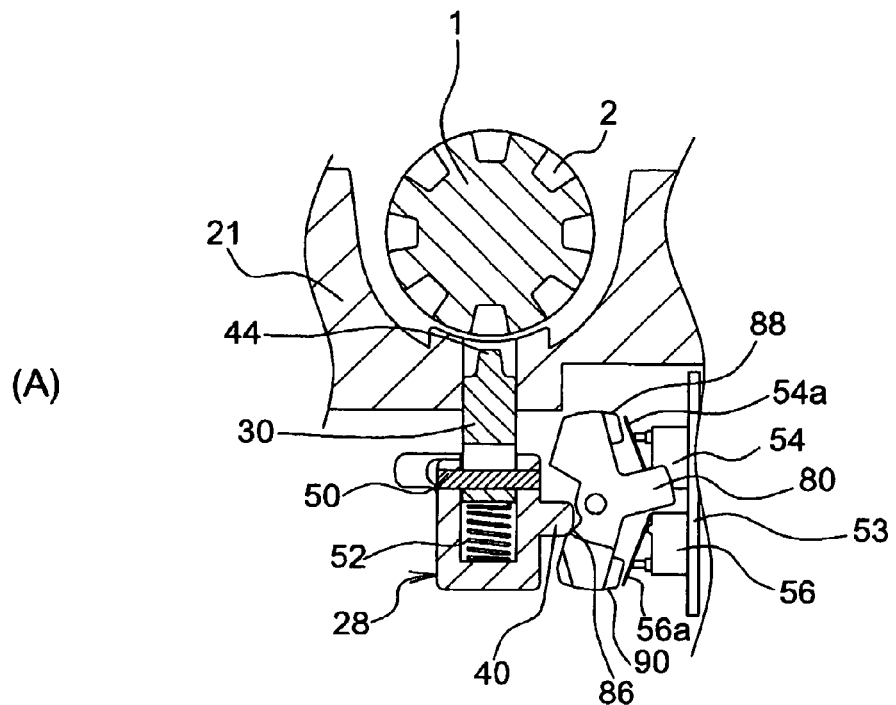
(B)
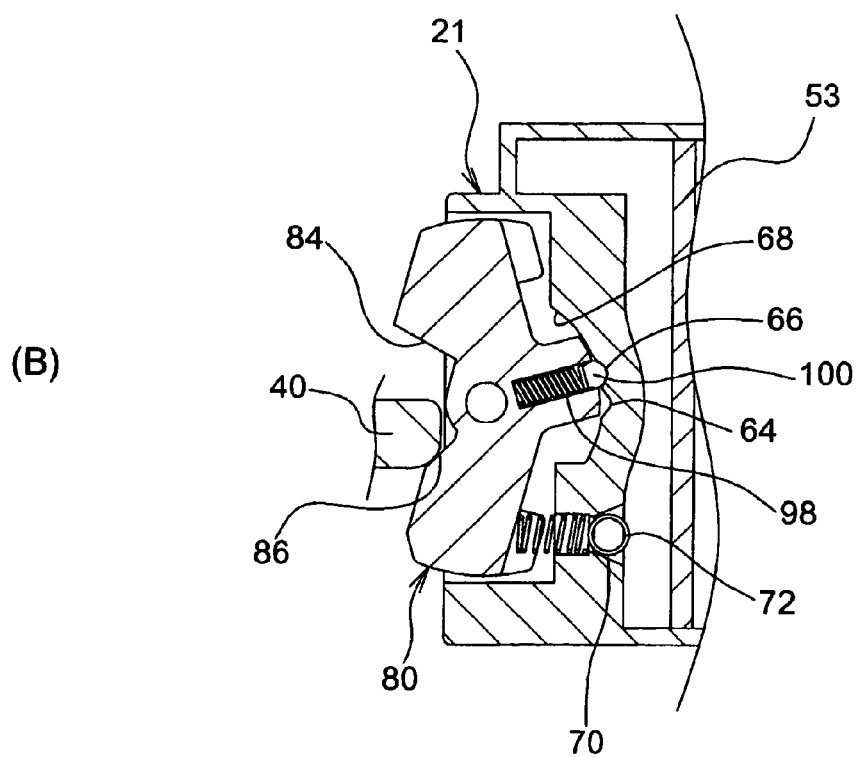

Fig.11
STATE THAT UNLOCK POSITION
DETECTING SWITCH TURNS OFF TO ON
(A)
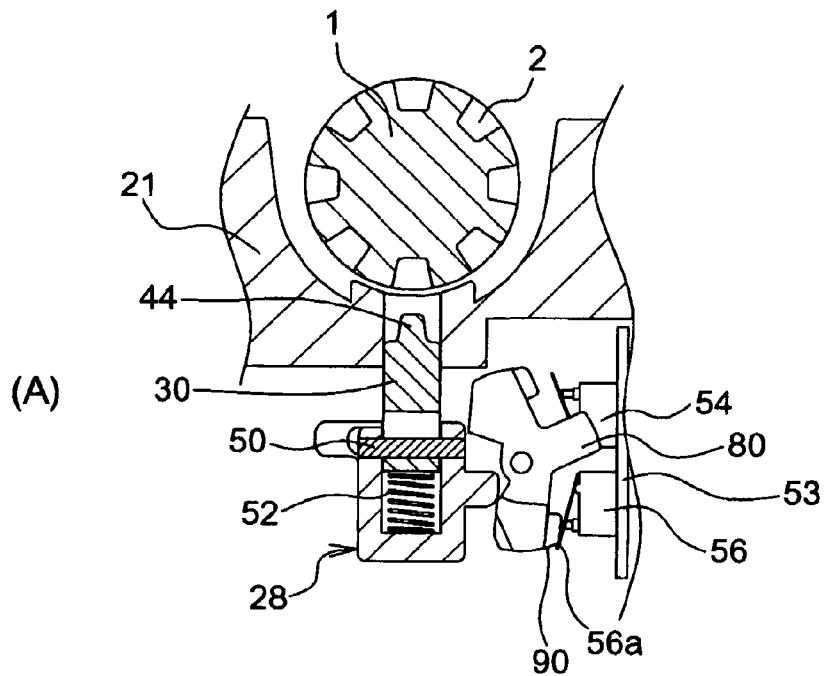
(B)
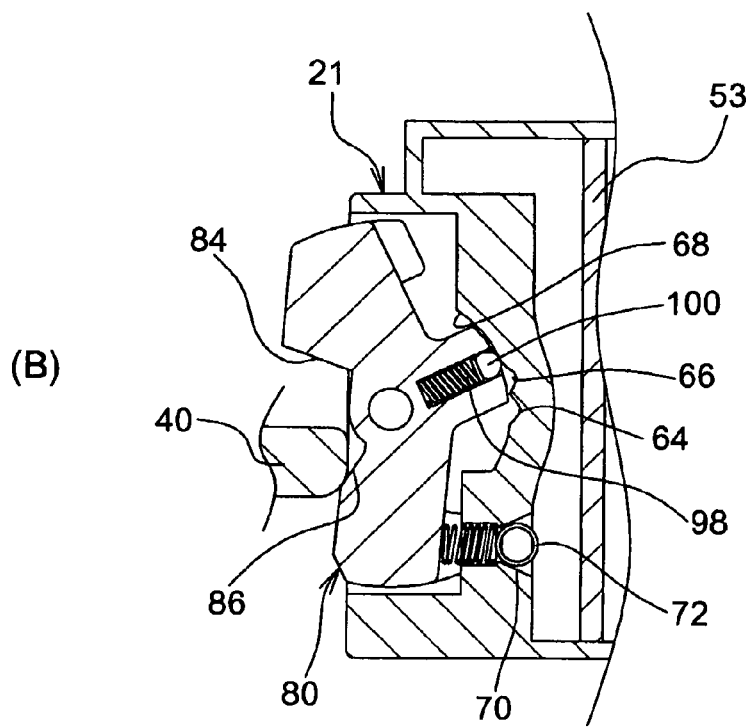

Fig. 12
STATE THAT UNLOCK POSITION DETECTING SWITCH TURNS OFF
(A) 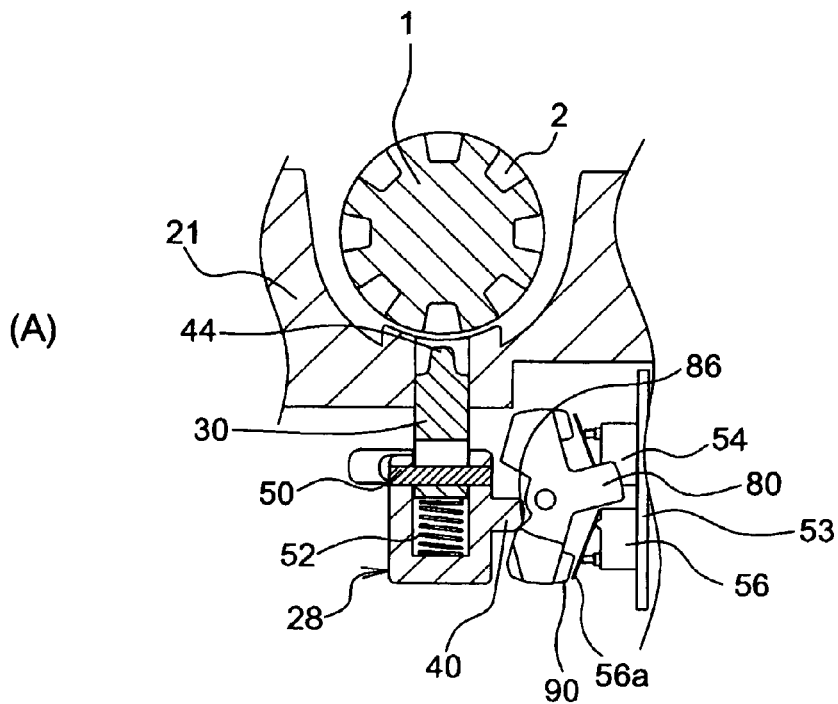
(B) 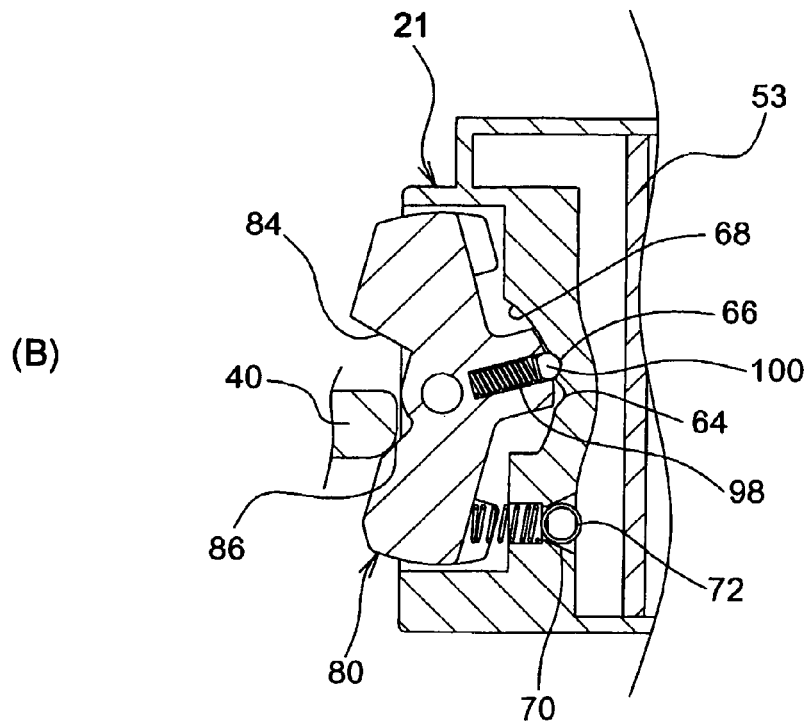

Fig. 13
STATE THAT ENGAGEMENT STARTS
(A)
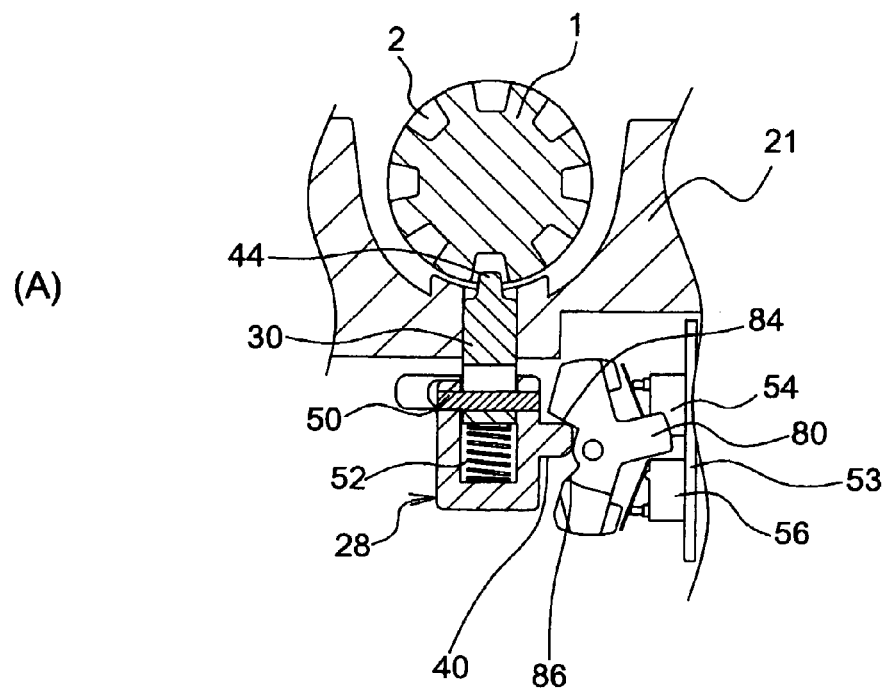
(B)
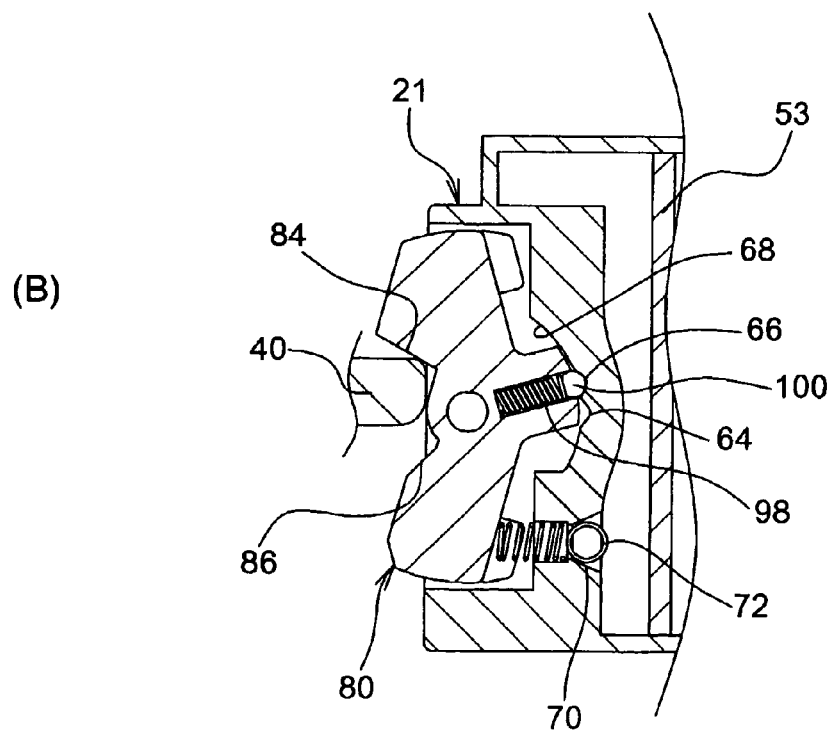

Fig. 16
STATE THAT LOCK SHAFT CANNOT FIT
IN RECESS PORTION OF STEERING SHAFT
(A)
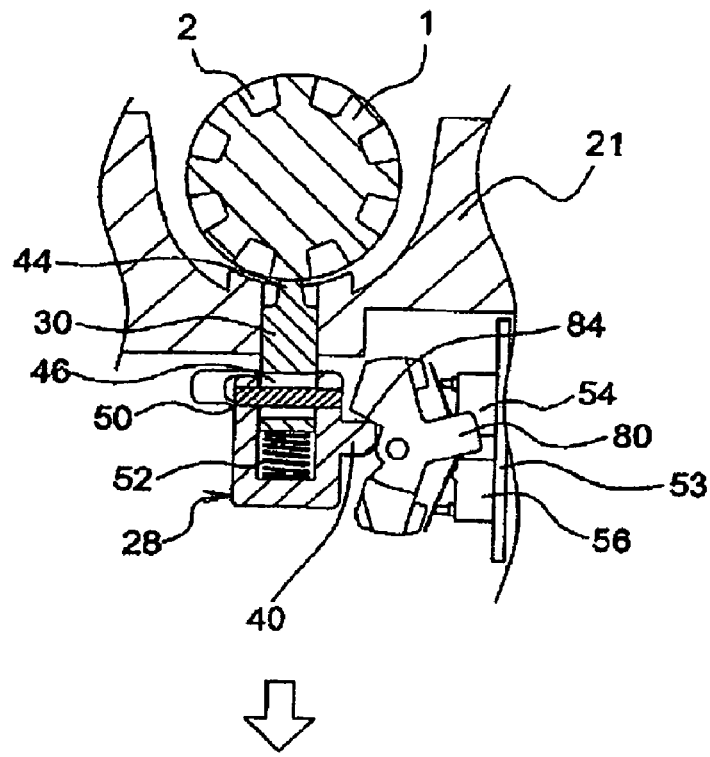
(B)
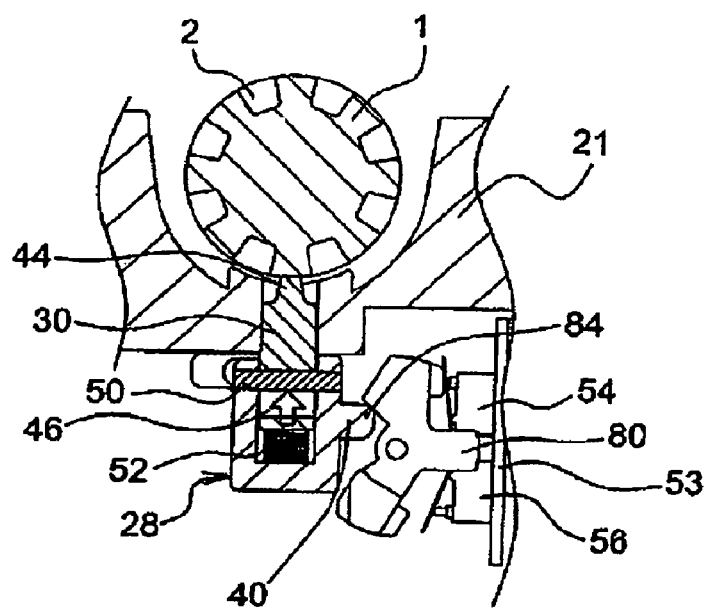

STEERING LOCK UNIT

BACKGROUND OF THE INVENTION

1. Technical Field

The present invention relates to a steering lock unit for locking a steering wheel of vehicle and so on.

2. Description of the Related Art

Conventionally, a steering lock unit for locking a steering wheel is employed to prevent the theft of a vehicle and so on. Typically, in the steering lock unit, when a lock shaft enters a recess formed on the outer surface of a steering shaft coupled to the steering wheel, the steering wheel becomes locked. When the shaft escapes the recess, the steering wheel becomes unlocked.

The conventional power steering lock unit has only one drive system of the lock shaft, and thus it is difficult to achieve a balance between an operating speed and an extracting force of the lock shaft. For example, a steering lock unit disclosed in patent document JP2006-15984A adopts a system in which movement of a cam follower along a cam groove allows the lock shaft to move back-and-forth relative to the steering shaft. The inclination angle of the cam groove is made gentle and steep to provide an operation range that places priority on the operation speed of the lock shaft and an operation range that places priority on the extracting force of the lock shaft.

In patent document JP2004-106750A, there is disclosed a steering lock unit in which a lock position and an unlock position of the lock shaft are detected using two detecting switches and also a correct position of the lock shaft on an intermediate area between the lock position and the unlock position can be accurately detected using a resistance change measuring device.

However, in the steering lock unit of JP2006-15984A, in spite of an engagement state of the lock shaft and the steering shaft, the lock shaft normally performs a constant operation at a predetermined position. However, it is not possible to perform an operation by placing priority on any one of the operating speed and the extracting force of the lock shaft according to the engagement state.

In the steering lock unit of JP2004-106750A, although the correct position of the lock shaft on the intermediate area can be detected using the resistance change measuring device, it is necessary to provide the resistance change measuring device and accordingly provide on the outer surface of the lock shaft a special coating of which resistance varies in a continuous or stepwise manner. However, this arrangement is disadvantageous because the construction becomes complicated and the cost becomes higher.

Further, in the steering lock unit of JP2004-106750A, a projection provided in a lateral direction on the side surface of the front end of the lock shaft operates a lock state detecting switch while a projection provided rearward in a longitudinal direction (i.e. in a moving direction of the lock shaft) operates an unlock state detecting switch. Therefore, it is necessary to dispose the two detection switches separately more than at least a distance obtained by adding a stroke of the lock shaft to a length between the position of the lock state detecting switch and the tip end of the projection on the rear end of the lock shaft. This constitutes an obstacle regarding the design for downsizing the steering lock unit.

SUMMARY OF THE INVENTION

Thus, it is an object of the present invention to provide a steering lock unit with which it is possible to place priority on the operating speed or the extracting force of the lock member according to the engagement state of the lock member to the movable member.

It is another object of the present invention to provide a steering lock unit with which it is possible to accurately detect a lock state or an unlock state of the steering shaft with a simple and low cost construction and also possible to downsize the unit.

In order to achieve the objects, the present invention provides a steering lock unit comprising a lock member which holds and releases engagement with a movable member interlocked with operation of a steering wheel so that the movable member is locked and unlocked, an actuator driven by electric power supplied from a battery mounted on a vehicle, and a transmission mechanism which transmits power of the actuator to the lock member. The transmission mechanism comprises:

a shaft member which is adapted to rotate in response to the operation of the actuator; and a cam member which engages with the shaft member and transmits the operation of the actuator to the lock member.

When releasing the engagement of the lock member with the movable member, the shaft member and the cam member integrally rotate in a normal state, while the cam member moves in an axial direction with respect to the shaft member in a situation when a pull-out force of the lock member, greater than a predetermined quantity, is necessary.

According to this construction, since the cam member which con rotate and linearly move with respect to the shaft member is provided as the member for transmitting the power to the lock member, two methods as to the drive of the lock member can be taken. That is to say, at the time of linear movement of the cam member with respect to the shaft member, the operating speed of the lock member is slow but a large pull-out force can be obtained. On the other hand, at the time of rotation of the cam member with respect to the shaft member, pull-out force of the lock member is small but the operating speed can be fast. Therefore, in the normal state in which no load acts on the lock member, it can have priority to move quickly the lock member due to the rotation of the cam member. In the case in which a large pull-out force with respect to the lock member is required at the time of unlock because the tip end portion of the lock member is pressed by the lateral surface of the recess portion of the movable member, it can have priority to pull out the lock member with a large force due to the linear movement of the cam member. In this manner, based on the engagement state of the lock member with respect to the movable member, either the operating speed or the pull-out force with respect to the lock member can have priority.

In the steering lock unit of the present invention, the cam member may be a substantially cylindrical member which engages with the lock member and is formed with an internal thread on the inner surface of the through hole, and the shaft member may have an external thread corresponding to the internal thread of the cam member so that the cam member and the shaft member are engaged with each other and assembled.

According to this construction, the shaft member is engaged with the through hole of the cam member by threads which lead is generally small. Therefore, even if a large pull-out force is required at the time when the lock member is engaged with the movable member, the cam member linearly moves with respect to the shaft member due to the screw drive, thereby enabling sure release of the engagement between the lock member and the movable member.

The friction force is generated between the female thread of the cam member and the male thread of the shaft member. Therefore, in the case that the pull-out force required to release the engagement of the lock member is lower than the predetermined value, the cam member can move integrally (interlock) with the shaft member due to the friction force described above.

In the steering lock unit of the present invention, preferably, the cam member is formed with a cam groove on the outer surface and stopper portions on both ends of the cam groove so that the lock member comes into contact with the stopper portions. The distance that the cam member moves with respect to the shaft member while the lock member comes into contact with one stopper portion then comes into contact with the other stopper portion is larger than the lead of the thread.

According to this construction, since the distance that the cam member moves with respect to the shaft member while the lock member comes into contact with one stopper portion then comes into contact with the other stopper portion is larger than the lead of the thread, it is possible to make the operating speed of the linear movement of the lock member at the cam groove due to the rotation of the cam member faster than that of the linear movement of the cam member or lock member due to the screw drive.

In the steering lock unit of the present invention, the shaft member may be disposed parallel to a back-and-forth movement direction of the lock member.

According to this construction, the linear movement of the cam member due to the shaft member can be directly transmitted to the lock member, and thus the power transmission to the lock member from the cam member can be efficiently conducted with the simplest construction.

In the steering lock unit of the present invention, the unit may further comprise:

first and second position detecting means for detecting an operating position of the lock member;

position deciding means for deciding the operating position of the lock member based on a detection signal from the position detecting means; and a swing member which is adapted to swing as the lock member moves to a lock position or an unlock position to allow any one of the first and second position detecting means to be operated.

According to this construction, the swing member operates any one of the first and second lock position detecting means in the lock position or the unlock position of the lock member. Therefore, when any one of the first and second position detecting means is operated (for example, ON), the other is certainly not operated (for example, OFF). Thus, there is no possibility that both the first and second position detecting means are operated. Therefore, even if the arrangement in which the swing member swings as the lock member moves is simple and low cost, it is possible to correctly detect the lock position and the unlock position of the lock member and also detect the failure of the position detecting means. As a result, it is possible to surely prevent such a situation in which the unlock signal is outputted from the position detecting means to start or drive the engine even though the engagement of the lock member with the movable member is not perfectly released.

In addition, since the movement (generally, linear movement) of the lock member to the lock position or the unlock position is converted to the swing movement (i.e., angular movement in the circumference direction) of the swing member to turn two position detecting means ON and OFF, it is possible to dispose two position detecting means at an interval that is shorter than the distance of linear movement of the lock member between the lock position and the unlock position regardless of the length of the lock member in the moving direction. As a result, it is possible to contribute to the downsizing of the unit.

In the steering lock unit of the present invention, the swing member may be housed in a switch case along with the first and second position detecting means, and the swing member may be provided with a protruding member which is biased outwardly by means of a first elastic member while inside the switch case is provided a detent portion for holding the operating position of the swing member in cooperation with the protruding member.

According to this construction, since the protruding member and the detent portion hold the operating position of the swing member in cooperation with each other, the operating condition of the first and second position detecting means can be held when the lock member is operated to a predetermined position.

In the steering lock unit of the present invention, the first position detecting means may be a lock position detecting switch while the second position detecting means may be an unlock position detecting switch, and the detent portion may be provided with a first detent recess in which the protruding member fits so that the swing member is held at a position where the lock position detecting switch is operated to ON.

According to this construction, since the first detent recess for holding the lock position in the ON state is provided, at a position (engagement position) where the lock member is on the way of movement from the lock position to the unlock position and does not complete the engagement release from the movable member, it is possible to continue the lock position detecting signal from the lock position detecting means. That is to say, in the case where the unlock position detecting means is in trouble and is normally ON, when the lock position detecting means is turned OFF while the lock member is in the engagement position, it is possible to enhance security by avoiding a possible situation in which the unlock state allows the engine to start or drive even though the movable member is still in the lock state.

In the steering lock unit of the present invention, the detent portion may be provided with a second detent recess in which the protruding member fits so that the swing member is held at a neutral position where neither the lock position detecting switch nor the unlock position detecting switch is operated to ON, and a slant surface may be formed continuously with the second detent recess so that the protruding portion, as it escapes from the second detent recess, comes into press contact with the slant surface when the swing member causes the unlock position detecting switch to be operated to ON.

According to this construction, when the swing member turns the unlock position detecting member ON, the protruding portion escapes from the second detent recess portion and comes into press contact with the inclined surface. According to this arrangement, a reaction force from the inclined surface, which is caused by the protruding portion being biased to the inclined surface by the first elastic member, acts in a direction that the protruding portion is returned to the second detent recess portion, i.e. a direction in which the swing member is returned to the neutral position. Thus, when the lock member starts to move from the unlock position toward the lock position; the swing member is released from the restriction due to the lock member to return to the neutral position. As a result, the operation of the unlock position detecting means can be immediately turned OFF.

In the steering lock unit of the present invention, the unit may further comprise a second elastic member for applying a force so as to return the swing member to the neutral position at a position where the swing member causes the unlock position detecting switch to be operated to ON.

According to this construction, the operation for immediately cutting the operation (turning OFF) of the unlock position detecting means as the lock member starts to move from the unlock position to the lock position can be surely conducted by providing the return spring, thereby enhancing safety.

As described above, according to the present invention, either the operating speed or the pull-out force with respect to the lock member can have priority based on the engagement state of the lock member with respect to the movable member.

In addition, according to the present invention, it is possible to correctly detect the lock state and the unlock state of the steering shaft with a simple and low cost constitution, thereby preventing the engine from being allowed to start or drive at the lock state and also enabling downsizing of the steering lock unit.

BRIEF DESCRIPTION OF THE DRAWINGS

FIG. 1 is a perspective view of a power steering lock unit of an embodiment according to the present invention showing a state in which a housing is removed from a lid;

FIG. 3 (A) is a partly exploded perspective view of a switch case with a part removed and a position block and FIG. 3(B) is a plan view and side view of the switch block;

FIG. 8(A) is a sectional view showing the lock shaft and the position block when the steering shaft is in the lock state, and FIG. 8(B) is a sectional view showing a relation between the position block and a detent portion in the state of FIG. 8(A);

FIGS. 9(A) and 9(B) are similar views to FIGS. 8(A) and 8(B) showing a state in which the lock shaft is under operation from the lock position of FIG. 8(A) to the unlock position;

FIGS. 10(A) and 10(B) are similar views to FIGS. 8(A) and 8(B) showing a state in which the lock position detection switch is OFF;

FIGS. 11(A) and 11(B) are similar views to FIGS. 8(A) and 8(B) showing a state in which the lock shaft has reached the unlock position;

FIGS. 12(A) and 12(B) are similar views to FIGS. 8(A) and 8(B) showing a state in which the lock shaft starts moving from the unlock position to the lock position and the unlock position detecting switch becomes OFF;

FIGS. 13(A) and 13(B) are similar views to FIGS. 8(A) and 8(B) showing a state in which the lock operation further progresses so that the engagement portion of the lock shaft starts engaging with the recess of the steering shaft;

FIGS. 16(A) and 16(B) are sectional views showing that the engagement portion of the lock shaft cannot engage with the recess of the steering shaft in the lock operation because position of the recess of the steering shaft is shifted.

EXPLANATION OF REFERENCE NUMERALS

Figure 2:
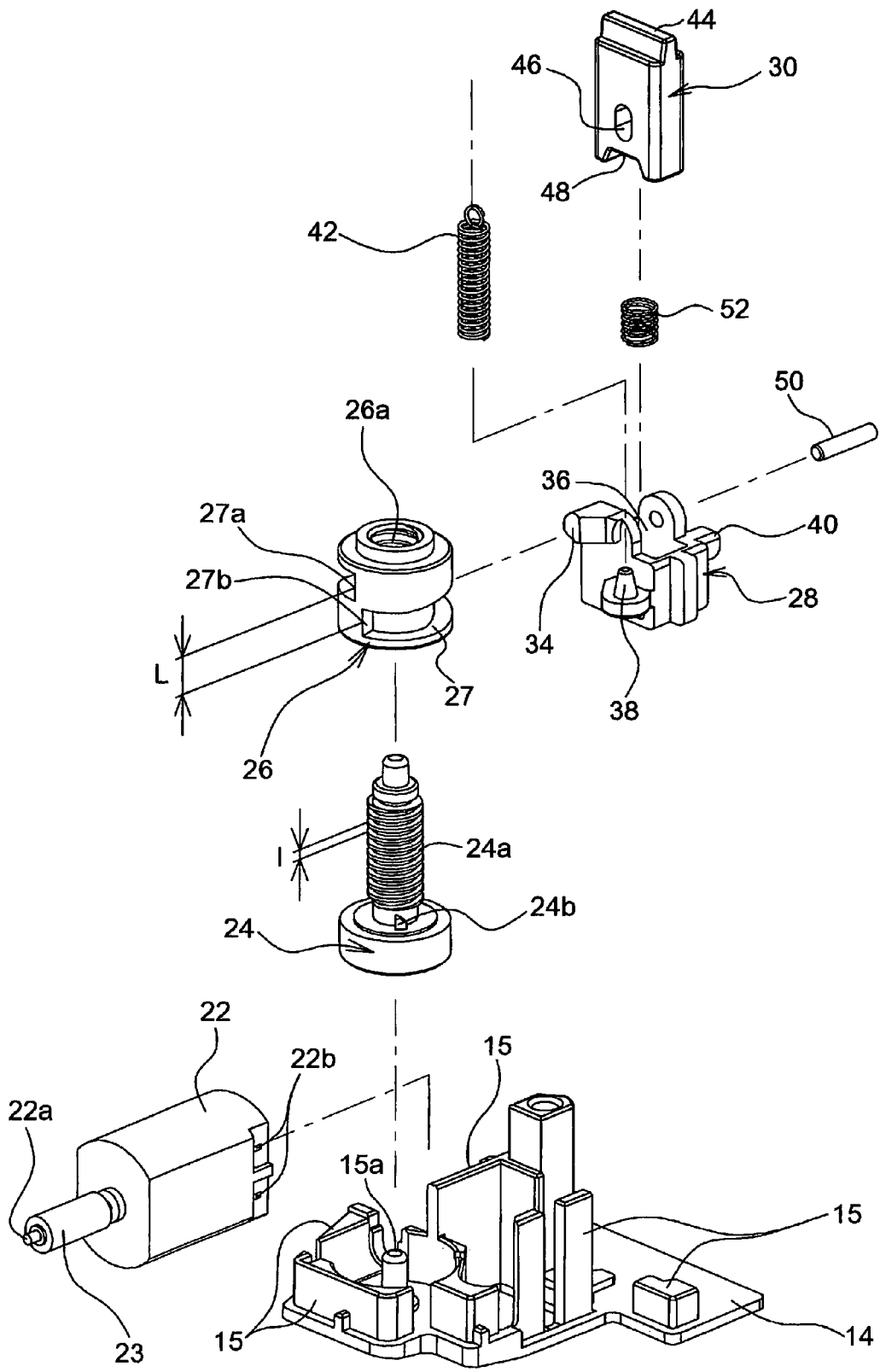
FIG. 2 is an exploded perspective view of a lock unit.

1 . . . steering lock shaft
2 . . . recess portion
10 . . . power steering lock unit
12 . . . housing
14 . . . lid
20 . . . lock unit
21 . . . switch case
22 . . . electric motor
24 . . . worm gear
24a . . . shaft portion (shaft member)
26 . . . winder (cam member)
27 . . . cam groove
28 . . . slider (lock member)
30 . . . lock shaft
53 . . . printed board
54 . . . lock position detecting switch
56 . . . unlock position detecting switch
60 . . . detent
64 . . . first detent recess portion
66 . . . second detent recess portion
68 . . . inclined surface
72 . . . return spring
80 . . . position block
98 . . . detent spring
100 . . . steel ball

DETAILED DESCRIPTION OF THE PREFERRED EMBODIMENTS

An embodiment of the present invention will be described hereinafter with reference to the accompanying drawings.

In the explanation, the terms of "upper", "lower", "right", "left", "front", "rear", "vertical" and "lateral" will be used as a matter of convenience but do not limit the construction of the present invention.

FIG. 1 shows a steering lock unit 10 of one embodiment according to the present invention with a housing 12 removed from a lid 14. The housing 12 is formed as an integral molded part made of metal or resin. The housing 12 has a lower end portion that is open and includes a housing space in its interior. On the upper end portion of the housing 12 is formed a curved surface portion 16 of substantially half cylindrical shape. On a substantially central portion is formed a lock shaft inserting hole 18 comprising, for example, a substantially rectangular opening portion.

The lid 14 also consists of an integral molded part made of metal or resin. On the lid 14, a plurality of support portions 15 (see FIG. 2) is provided an upright orientation. A lock unit 20 and a switch case 21 and so on are supported by the plurality of support portions 15 and integrated (modularized) with the lid 14. After fixing the lock unit 20 and the switch case 21 and so on onto the lid 14 to modularize them, the housing 12 is fixed on the lid 14 by means of, for example, screws (not shown) with the lock unit 20 and the switch case 21 and so on housed inside.

FIG. 2 is an exploded perspective view of the lock unit 20. Referring to FIGS. 1 and 2, the lock unit 20 is substantially comprised of an electric motor (actuator) 22, a worm wheel 24, a winder (cam member) 26, a slider (lock member) 28 and a lock shaft (lock member) 30. The worm wheel 24, winder (cam member) 26 and worm gear coupled to the electric motor, which will be described hereinafter, constitute a transmission mechanism for transmitting the power of the electric motor 22 to the lock shaft 30.

The electric motor 22 is fixed by the supports 15 on the lid 14. The terminal portions 22b of the electric motor 22 are directly connected to the terminal portions 32 (see FIG. 3) provided on the switch case 21 so that the electric power is fed to the electric motor from an on-vehicle battery (not shown). The construction in which fixation of the electric motor 22 to the lid 14 leads immediately to completion of the electrical connection makes it unnecessary to provide a harness for electric connection, thereby enabling one-touch connection and facilitating the assembling work.

A worm gear 23 is fixed on the shaft portion 22a of the electric motor 22. A worm wheel 24 is rotatably supported by a shaft-like support portion 15a provided in an upright position on the lid 14. The worm wheel 24 has a cylindrical shape with shaft portion (shaft member) 24a extending upwardly therefrom. On the outer circumference of the shaft portion 24a is formed a trapezoidal screw thread (lead between pitches is 1) which is a male thread. The worm wheel 24 has a protruded shape forming regulating portion 24b on the lower base end portion of the shaft portion 24a. The worm gear 23 of the electric motor 22 meshes with the worm wheel 24. Thus, a rotation force of the electric motor 22 can be transmitted to the worm wheel 24 via the worm gear 23. The shaft portion 24a is disposed parallel to the up-and-down linear moving direction or forward and backward direction of a slider 28 and a lock shaft 30 which will be described hereinafter. Thus, since the linear movement of the winder 26 due to the shaft portion 24a can be directly transmitted to the slider 28 and the lock shaft 30, the power transmission to the lock shaft 30 from the winder 26 can be efficiently conducted with the simplest construction.

The winder 26 is formed with a through hole 26a extending in the axial direction to have a substantially cylindrical shape. On the inner circumference of the through hole 26a is formed a female thread corresponding to the thread shape of the shaft portion 24a of the worm wheel 24. Thus, the winder 26 is coupled to the worm wheel 24 in a meshed state with the shaft portion 24a of the worm wheel 24 so that the winder 26 can linearly move in the up-and down direction along the axial direction of the shaft portion 24a as the worm wheel 24 rotates or can rotate integrally with the worm wheel 24. A cam groove 27 is formed on the outer circumference of the winder 26. The cam groove 27 is formed in the circumferential direction over substantially 360 degrees. The both ends of the cam groove 27 constitute rotation stop portions (stopper portion) 27a, 27b respectively which is comprised of step portions. The cam groove 27 extends in an oblique direction so as to make an acute angle with a plane perpendicular to the axial direction of the winder 26 and constitutes a part of spiral.

The slider 28 is slidably supported by the support portions 15 of the lid 14 in the up-and-down direction. The slider 28 has an engagement portion 34 integrally formed so as to protrude laterally. The engagement portion 34 enters in and engages with the cam groove 27 of the winder 26. Thus, when the winder 26 moves up and down or rotates integrally with the worm wheel 24, the engagement portion 34 moves relatively with the winder 26 or along the cam groove 27 of the winder 26, causing the slider 28 to move up and down.

In the case in which the winder 26 rotates integrally with the worm wheel 24, a moving distance L of the slider 28 (i.e. the moving distance of the lock shaft 30) moving relatively along the cam groove 27 from a position where the engagement portion 34 comes into contact with one end 27a of the cam groove 27 to a position where the engagement portion 34 comes into contact with the other end 27b of the cam groove 27 is set larger than lead 1 between the thread pitch of the shaft portion 24a of the worm wheel 24 (i.e. L>1).

A housing portion 36 is formed in a central portion of the slider 28. The housing portion has openings at an upper end and a bottom portion at the lower end. The slider 28 is formed with a spring receiving portion 38 of circular truncated cone shape oriented upward on the same side as the engagement portion 34 and a switch operating portion 40 on the opposite side relative to the engagement portion 34.

The lower end of an unlock spring 42 having a coil shape is fitted in and engaged with the spring receiving portion 38 of the slider 28. The upper end hook of the unlock spring 42 is engaged with the inner surface of the housing 12 assembled with respect to the lid 14. Thus, the unlock spring 42, in a completely assembled state, presses and biases the slider 28 (and therefore the lock shaft 30 fitted in the slider 28) in an unlock direction or a retracting direction or a lower direction.

The lock shaft 30 is made of casting having, for example, a flat vertically elongated rectangular shape and has a engagement portion 44 having a trapezoidal shape, as viewed from a lateral direction, on the tip end or the upper end. The lock shaft 30, nearer a lower end in relation to the center in the longitudinal direction, is formed with an elongated hole 46 extending in the axial direction and pierced in the thickness direction. On the lower end of the lock shaft 30 is formed a spring containing recess portion 48.

As described hereinafter, when the lock shaft 30 is at a lock position, the engagement portion 44 protruding from the inserting hole 18 of the housing 12 engages with the recess portion of the steering shaft (movable member) to become a lock state. On the other hand, when the lock shaft 30 is at an unlock position, the engagement portion 44 retracts into the housing 12 and releases the engagement with the steering shaft to become an unlock state.

The lock shaft 30, in a state disposed in the housing portion 36 of the slider 28, is assembled by a pin 50 which pierces the elongated hole 46 of the lock shaft 30 and both ends of which are supported at both side walls of the housing portion 36 of the slider 28. The lock shaft 30, assembled as described above, moves in the up-and-down direction along with the slider 28. However, the lock shaft 30 can move in the vertical direction relative to the slider 28 because the pin 50 is movable in the vertical direction inside the elongated hole 46. The lock spring 52, contained in the spring containing recess portion 48 of the lock shaft 30, is disposed in a state sandwiched between the lock shaft 30 and the bottom portion of the housing portion 36 of the slider 28. Thus, the lock shaft 30 is pressed and biased in the lock direction or the protruding direction or the upper direction by the lock spring 52, resulting in a state where the pin 50 comes into contact with the lower end of the elongated hole 46.

FIG. 3 is a partly exploded perspective view showing an internal construction of the switch case 21 and a position block 80 with part of the switch case 21 removed.

On the lower rearward portion of the switch case 21 is integrally formed a connector 21a for supplying electric power from the on-vehicle battery to the power steering lock unit 10 (see FIG. 1). On the rear surface of the switch case 21, a printed board 53 is engaged and held by engagement claws 51 (only upper one is shown) provided on the upper and lower portions of the switch case 21, respectively. The printed board 53 is electrically connected to the terminal portions (not shown) provided on the switch case 21 so that electric power can be supplied from the on-vehicle battery. An electric circuit including, for example, a CPU (Central Processing Unit) and so on is electrically connected to each position detection switch which will be described hereinafter so that the printed board 53 can function as a position determining means for determining the position of the lock shaft 30.

On the printed board 53 facing the housing space 58 of the switch case 21, a lock position detecting switch 54 and an unlock position detecting switch 56 are mounted close to each other in the vertical direction. Each of the position detecting switches 54, 56 is constituted by, for example, a limit switch having plate-like switch pieces 54a, 54b (see FIG. 8A) which are capable of swinging movement.

Inside the switch case 21, a detent portion 60 is disposed and contained close to the position detecting switches 54, 56 in the lateral direction. In the present embodiment, the detent portion 60, as shown in FIG. 8B, is integrally constituted as a part of the switch case 21 but may be constituted as a separate member fixed on the internal wall surface of the switch case 21 or the printed board 53.

On the detent portion 60, a recess portion 62 having a bottom portion curved in a substantially arcuate shape is formed at the opposite side relative to the printed board 53. On the bottom portion of the recess portion 62, a first detent recess portion 64 having a substantially V-shape cross section is formed at the substantially central position in the longitudinal direction and also a second detent recess portion 66 having a substantially V-shape cross section is formed close to the first detent recess portion 64 in the upper direction. In addition, an inclined surface 68, curved in a substantially arcuate shape extending upward, is formed continuously from the second detent recess portion 66.

In the lower portion of the detent portion 60, a mounting hole 70 is provided. The mounting hole 70 is formed with an enlarged tapered portion at one end. A return spring 72 of coil shape is inserted and mounted in the mounting hole 70 from the side of the printed board 53. A ring portion provided at one end of the return spring 72 is press-fitted in the tapered portion of the mounting hole 70 so that the return spring 72 never gets out of the mounting hole 70 even if the other end protruding from the detent portion 60 is pressed by the position block 80 which will be described hereinafter.

The second resilient member is not limited to the coil spring as illustrated but may be any other resilient member such as a leaf spring, rubber and so on as long as it carries out the same function for biasing the position block 80. The second resilient member may be one applying a tension force to the position block 80.

As shown in FIG. 3, the switch case 21 is provided with a containing hole 74 including a rectangular parallelepiped space and has an opening portion opposite relative to the lock unit 20. On both side walls in the lateral direction of the containing hole 74 (a part of the switch case 21), swing shafts 76 having a small protruding quantity and having an inclined surface on the opening portion side are provided respectively (only one side is shown). On the other hand, a shaft receiving hole 82 is formed on the position block 80. Thus, when the position block 80 is forced into the containing hole 74 through the opening portion of the switch case 21, the inclined surfaces of the swing shaft 76 come into contact with both side surfaces of the position block 80, causing both side walls of the containing hole 74 to be widened outward in the lateral direction. Further forcing the position block 80 in causes the swing shaft 76 to fit into the shaft receiving hole 82, thereby causing the position block 80 to be swingably mounted in the containing hole 74. The position block 80, mounted as described above, protrudes by a predetermined quantity from the opening portion of the containing hole 74 toward the side of the lock unit 21 (see FIG. 1).

As shown in FIG. 3, the position block 80 has a substantially Y-shape viewed from a lateral direction. On both end portions extending toward both sides of the shaft receiving hole 82, position block 80 has protruding portions which protrude in the forward direction (i.e. lock unit side). The side surfaces on the shaft receiving hole side of protruding portions constitute a lock side contact surface 84 and the unlock side contact surface 86, respectively, which come into contact with the switch operating portion 40 of the slider 28 moving up and down. On the back side surface of both end portions of the position block 80, a lock protrusion 88 and an unlock protrusion 90 are provided, respectively. The protrusions 88, 90 are adapted to face or come into contact with the switch pieces 54a, 56a of the lock position detecting switches 54, 56.

The position block 80 has a leg portion 92 extending in the rearward direction. The tip end of the leg portion 92 is formed with a containing recess portion 94 so that the detent portion 60 is received in the containing recess portion 94 when the position block 80 is mounted in the switch case 21 as described above. In the leg portion 92 of the position block 80, a spring containing hole 96 is formed on the bottom portion of the containing recess portion 94. The position block 80 is mounted in the switch case 21 in a state in which a detent spring 98 and a steel ball 100 are contained in the spring containing hole 96 provided in the leg portion 92. Thus, the steel ball 100 is biased in the outward direction by the detent spring 98 to protrude partly from the spring containing hole 96 and come into press contact with the bottom portion of the recess portion of the detent portion 60.

In the present embodiment, the steel ball 100 is utilized as the protruding member but the protruding member is not limited to this embodiment. The material and shape thereof may be changed appropriately. The second resilient member for biasing the protruding member is not limited to the coil spring as illustrated but may be any other resilient member such as a leaf spring, rubber and so on as long as it carries out the same function for biasing the protruding member.

Next, the unlock operation and lock operation in the lock unit 20 of the steering lock unit 10 is described below.

At a corresponding position where the lock shaft 30 can move forward and rearward through the opening portion formed on a cylindrical steering column (not shown) surrounding the steering shaft 1 (see FIG. 8(A)), the steering lock unit 10 is fixed by means of for example screws in a state in which the curved surface portion 16 of the housing 12 comes into contact with the outer circumference of the steering column. On the outer circumference of the steering shaft, a plurality of recesses 2 (see FIG. 8(A)), in which the engagement portion 44 of the lock shaft 30 can be fitted, is formed at a constant pitch over the entire circumference. The steering shaft 1 is a movable member which rotates in conjunction with the operation of the steering wheel (not shown).

When the vehicle is prohibited from starting or running the engine (for example, a user having a normal electronic key is not in the car or near the car), the lock shaft 30 is the lock position. At this time, as the engagement portion 44 of the lock shaft 30 engages with the recess portion of the steering shaft, the steering shaft is locked.

Figure 4:
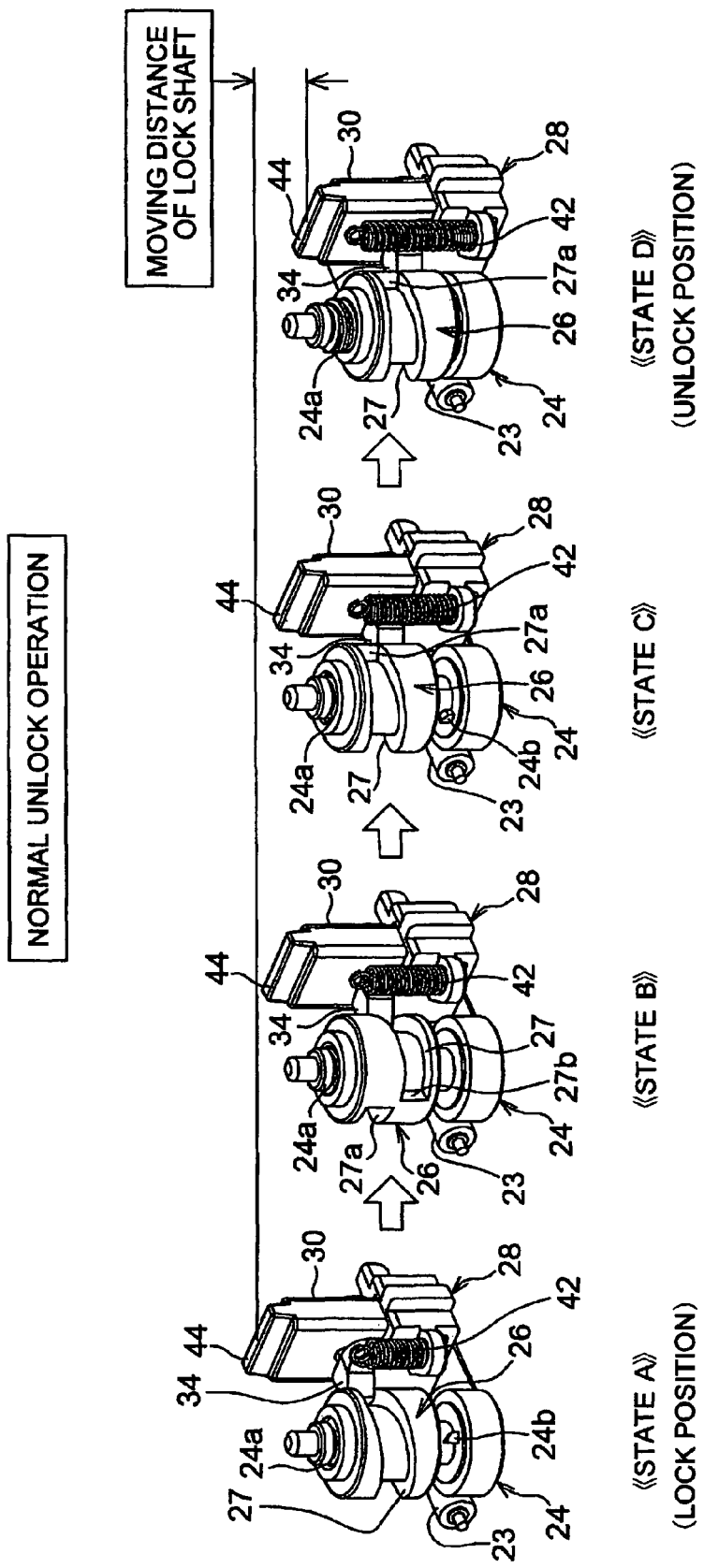
FIG. 4 shows an unlock operation over time in a normal state.

FIG. 4 shows, in a stepwise manner, an unlock operation in a normal state in which no large pull-out force with respect to the lock shaft 30 is necessary when retreating or engagement releasing the lock shaft 30 from the recess portion of the steering lock shaft.

In the state A, the lock shaft 30 is in the lock position where the engagement portion 44 at the end of the lock shaft 30 engages with the recess portion of the steering shaft. At this time, since the lateral surface of the recess portion does not come into contact with the lateral surface of the engagement portion 44, no large pull-out force is necessary when engagement releasing the lock shaft 30 from the steering shaft. When the lock shaft 30 is in the lock position, the engagement portion 34 of the slider 28 is in the cam groove 27 of the winder 26 and comes into contact with one of the rotation stopper portions 27a.

For example, a user having a normal electronic key gets in the vehicle and pushes the engine operating switch, the electric motor 22 of the power steering lock unit 10 is powered to rotate forward. Thus, the power of the electric motor 22 is transmitted to the worm wheel 24 via the worm gear 23, thereby allowing the worm wheel 24 to rotate in the counterclockwise direction as viewed from above.

At this time, in the normal state as described above, the pull-out force of the lock shaft 30 is relatively small. Thus, the friction force between the male thread of the shaft portion 24a of the worm wheel 24 and the female thread of the winder 26 is larger than the friction force between the engagement portion 34 of the slider 28 and the lateral surface of the cam groove 27 of the winder 26, causing the winder 26 to rotate integrally with the worm wheel 24. When the winder 26 starts to rotate along with the worm wheel 24, the engagement portion 34 of the slider 28 leaves the rotation stopper portion 27a of the cam groove 27 of the winder 26 and moves along the cam groove 27. This causes the lock shaft 30, as shown in state B, to linearly move downward from the lock position toward the unlock direction. Thus, the engagement portion 44 of the lock shaft 30 escapes from the recess portion of the steering shaft, causing the engagement to be released (unlocked).

When the winder 26 further rotates, the lock shaft 30 moves furthermore downward to state C as the engagement portion 34 moves along the cam groove 27. Then, the engagement portion 34 comes into contact with the other rotation stopper portion 27b of the cam groove 27, thereby restricting further rotation of the winder 26. At this time, the engagement portion 44 of the lock shaft 30 has already escaped from the recess portion of the steering shaft but the lock shaft 30 does not yet reach the unlock position.

After reaching the state C, the electric motor 22 continues forward rotation. Thus, the worm wheel 24 also continues rotation. At this time, since the rotation of the winder 26 has already been restricted, the winder 26 moves downward in the axial direction with respect to the shaft portion 24a by the screw drive while maintaining the state in which the engagement portion 34 comes into contact with the other rotation stopper portion 27b of the cam groove 27. Thus, the slider 28 and the lock shaft 30 also linearly move downward and reach the unlock position as shown in state D.

At this time, the lower surface of the winder 26 comes into contact with the restricting portion 24b provided on the base end portion of the shaft portion 24a of the worm wheel 24 so that further downward movement is restricted. Thus, the winder 26 is stopped at the unlock position and simultaneously the operation of the electric motor 22 is stopped.

In the unlock operation described above, the biasing force for the unlock spring 42 to press the slider 28 becomes maximum at state A and minimum at state D. The unlock spring 42 plays a role on assisting in the pull-out force of the lock shaft 30.

The unlock operation at a settled state will be described with reference to FIG. 5. Here, the term of "settled state" means a state in which the engagement portion 44 of the lock shaft 30 fits in the recess portion of the steering shaft; a torque acts on the steering shaft so that the lateral surface of the recess portion strongly comes into press contact with the lateral surface of the engagement portion 44; and a large pull-out force, which is greater than a predetermined value is necessary to pull out the lock shaft 30. The torque or load acting on the lock shaft 30 is referred to as "settled-state torque".

In the state A, in the same manner as in FIG. 4, the lock shaft 30 is at the lock position and one rotation stopper portion 27a of the cam groove 27 of the winder 26 comes into contact with the engagement portion 34 of the slider 28. From this state, the electric motor 22 is forwardly driven to cause unlock operation in the same manner as in FIG. 4. At this time, since the settled-torque acts on the lock shaft 30, the pull-out force becomes extremely large compared with the normal state described above. Thus, since the friction force between the engagement portion 34 of the slider 28 and the lateral surface of the cam groove 27 of the winder 26 is larger than the friction force between the male thread of the shaft portion 24a of the worm wheel 24 and the female thread of the winder 26, the shaft portion 24 rotates in the counterclockwise direction as viewed from above without causing the winder 26 to rotate integrally with the worm wheel 24. Thus, the winder 26 linearly moves downward by the screw movement without rotating. Thus, the lock shaft 30 also linearly moves downward until the lower surface of the winder 26 comes into contact with the restricting portion 24b to become state G. At this time, the engagement portion 44 of the lock shaft 30 escapes from the recess portion of the steering lock shaft, thereby causing the engagement to be released (unlocked).

As described above, since the lock shaft 30 is moved downward by the screw movement when the settled-torque acts, the operating speed is slow compared to the operation by the cam groove 27 as in FIG. 4 but a large pull-out force can be obtained, enabling the lock shaft 30, on which the settled torque acts, to be surely pulled out.

A force required to move the lock shaft 30 after the engagement with the steering shaft was released becomes relatively small. Therefore, after state G, as the friction force between the male thread of the shaft portion 24a of the worm wheel 24 and the female thread of the winder 26 becomes larger than the friction force between the engagement portion 34 of the slider 28 and the lateral surface of the cam groove 27 of the winder 26, the winder 26 rotates integrally with the worm wheel 24. Thus, when the winder 26 rotates along with the worm wheel 24, the engagement portion 34 of the slider 28 leaves the rotation stopper portion 27a of the cam groove 27 of the winder 26 and moves along the cam groove 27. Accordingly, as shown in state H, the lock shaft 30 linearly moves downward. Also, when the engagement portion 34 of the slider 28 comes into contact with the other rotation stopper portion 27b of the cam groove 27, the lock shaft 30 reaches the unlock position as shown in state D. Simultaneously, the operation of the motor 22 is stopped.

As described above, according to the steering lock unit 10 of the present embodiment, since the winder 26, which can rotate and linearly move with respect to the shaft portion 24a is provided as the member for transmitting the power to the lock shaft 30, two methods as to the drive of the lock shaft 30 can be taken. That is to say, at the time of linear movement of the winder 26 with respect to the shaft portion 24a, the operating speed of the lock shaft 30 is slow but a large pull-out force can be obtained. On the other hand, at the time of rotation of the winder 26 with respect to the shaft portion 24a, the pull-out force of the lock shaft 30 is small but the operating speed can be fast. Therefore, at the normal state in which no load acts on the lock shaft 30, it can have priority to move quickly the lock shaft 30 due to the rotation of the cam groove 27 of the winder 26. In the case that a large pull-out force with respect to the lock shaft 30 is required at the time of unlock because a settled torque acts, it can have priority to pull out the lock shaft 30 with a large force due to the linear movement of the winder 26. In this manner, based on the engagement state of the lock shaft 30 with respect to the steering shaft, either the operating speed or the pull-out force with respect to the lock shaft 30 can have priority.

The shaft portion 24a and the winder 26 engage with each other by threads in which the lead is generally small. Therefore, even if a settled torque acts on the lock shaft 30 and a large pull-out force is required at the time of unlock, the winder 26 linearly moves with respect to the shaft portion 24a due to the screw drive, thereby enabling the engagement between the lock shaft 30 and the steering shaft to be surely released.

The friction force is generated between the female thread of the winder 26 and the male thread of the shaft portion 24a. Therefore, in the case in which the pull-out force required to release the engagement of the lock shaft 30 is lower than the predetermined value, the winder 26 can move integrally (interlock) with the shaft portion 24a due to the friction force described above.

The moving distance L of the slider 28 with respect to the shaft portion 24a from a position where the engagement portion 34 comes into contact with one end 27a of the cam groove 27 to a position where the engagement portion 34 comes into contact with the other end 27b of the cam groove 27 is set larger than lead 1. Therefore, it is possible to make the operating speed of the linear movement of the lock shaft 30 at the cam groove 27 due to the rotation of the winder 26 faster than that of the linear movement of the winder 26 or lock shaft 30 due to the screw drive.

Figure 6:
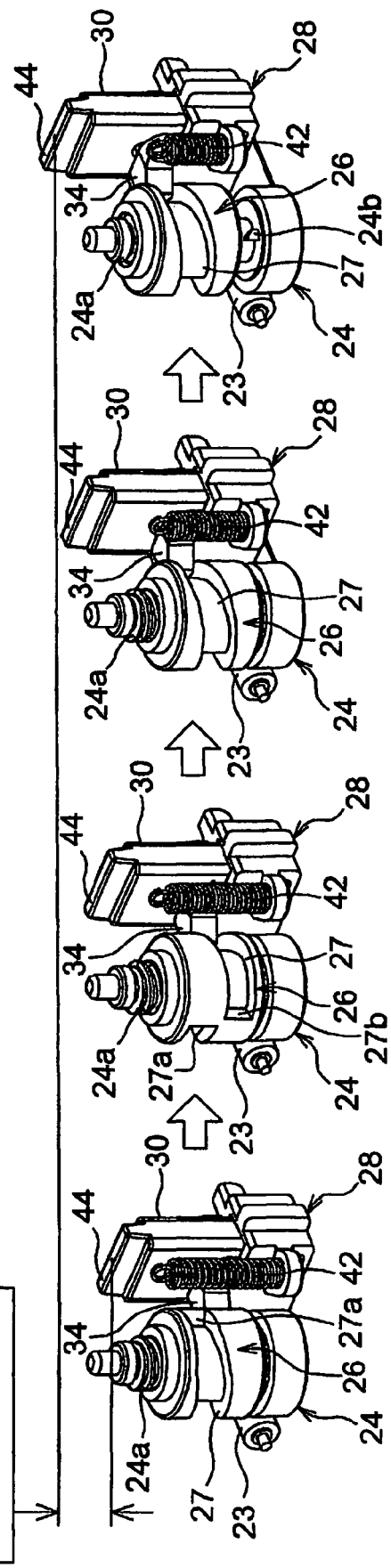
FIG. 6 shows a normal lock operation over time.

The unlock operation and lock operation in the lock unit 20 of the steering lock unit 10 is described with reference to FIG. 6.

Figure 5:
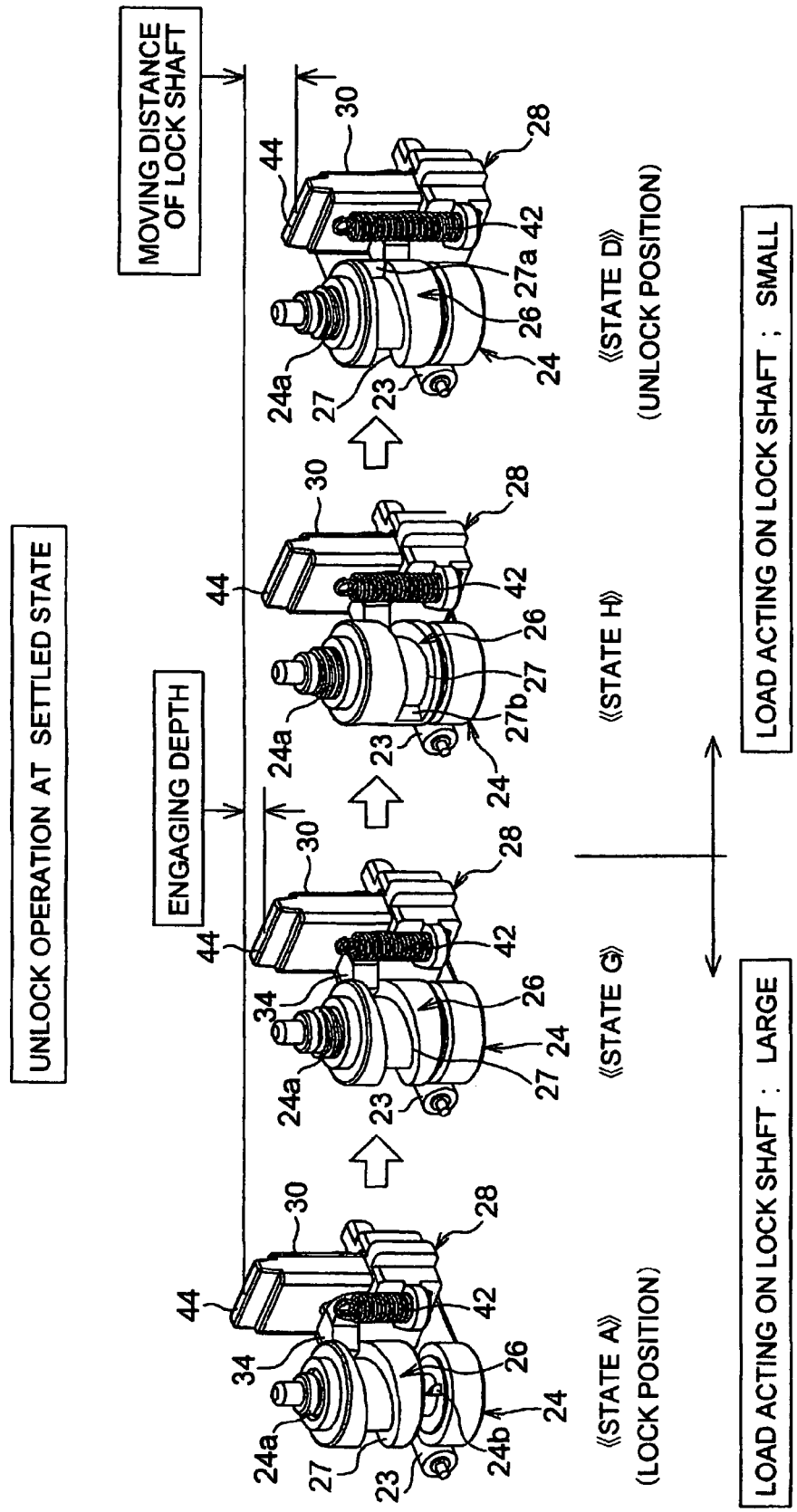
FIG. 5 shows an unlock operation over time in a settled state.

At state D, the lock shaft 30 is at the unlock position in the same manner as in FIGS. 4 and 5.

For example, when detecting that a user having a normal electronic key has left the vehicle more than a predetermined distance after stopping the engine or after stopping the engine and closing the door of the vehicle, an upper ECU transmits a lock command to the power steering lock unit 10. The printed board 53 receives the command and reversely drives the electric motor 22. Thus, the power of the electric motor 22 is transmitted via the worm gear 23 to rotate the worm wheel 24 in the clockwise direction as viewed from above.

At this time, a push-in force for linearly moving the lock shaft may be small. Therefore, the friction force between the male thread of the shaft portion 24a of the worm wheel 24 and the female thread of the winder 26 is larger than the friction force between the engagement portion 34 of the slider 28 and the lateral surface of the cam groove 27 of the winder 26, causing the winder 26 to rotate integrally with the worm wheel 24. When the winder 26 starts to rotate along with the worm wheel 24 in the clockwise direction viewed from above, the engagement portion 34 of the slider 28 leaves the other rotation stopper portion 27b of the cam groove 27 of the winder 26 and moves along the cam groove 27. This causes the lock shaft 30 as shown in the state E to linearly move upward from the unlock position toward the lock direction.

Further rotation of the winder 26 causes the lock shaft 30 to linearly move upward. At state F in which the engagement portion 34 of the slider 28 comes into contact with one rotation stopper portion 27a of the cam groove 27, the rotation of the winder 26 is restricted. After that, as the electric motor 22 continues reverse rotation, the worm wheel 24 and the shaft portion 24a also continue to rotate. Thus, the winder 26 linearly moves upward with respect to the shaft portion 24a by the screw drive without rotating. Along with this, the lock shaft 30 also linearly moves upward and reaches the lock position as shown in state A, causing the electric motor 22 to be stopped. Thus, the engagement portion 44 of the lock shaft 30 fits into the recess portion of the steering shaft to lock the steering shaft (and steering wheel).

Figure 7:
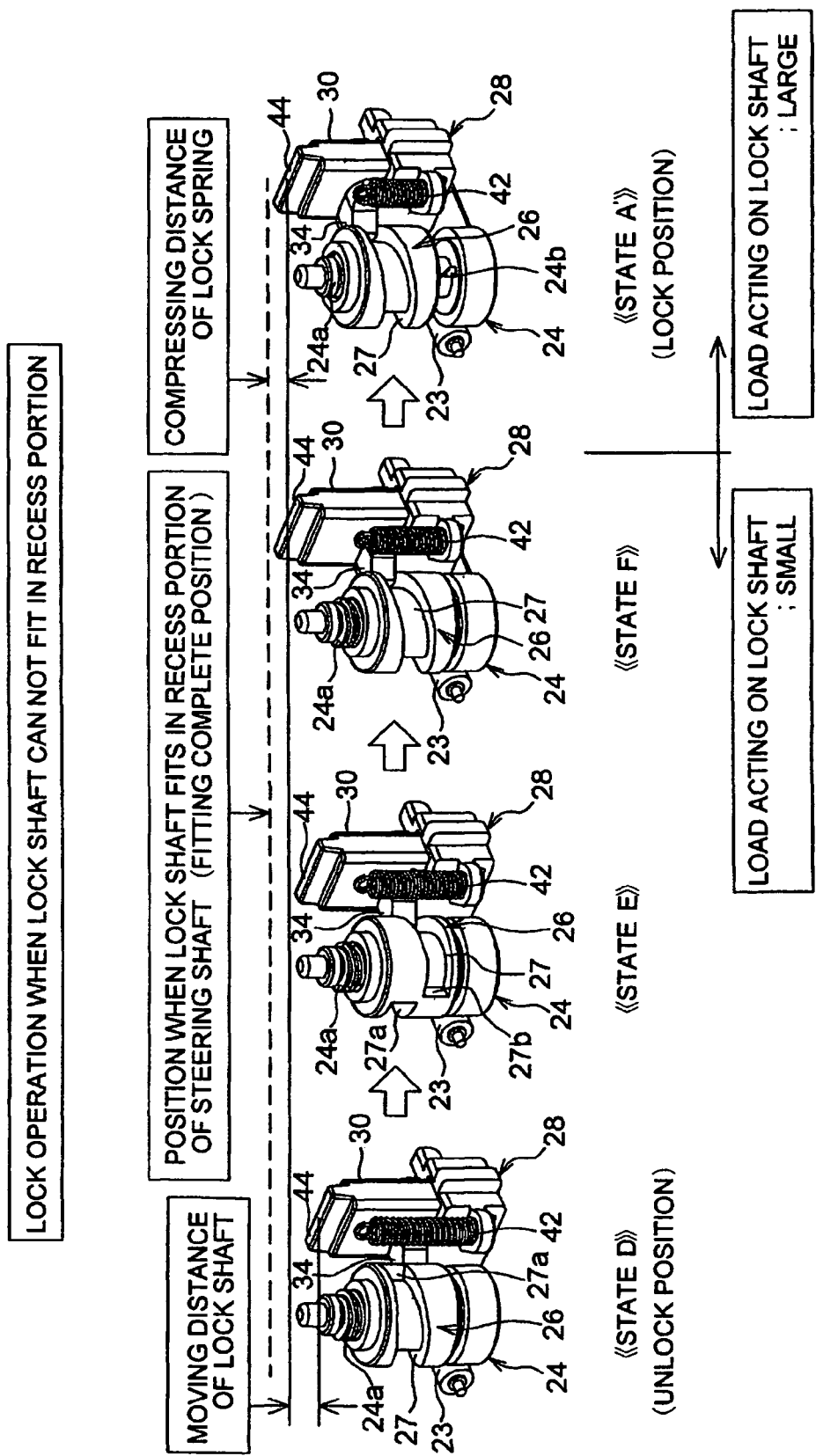
FIG. 7 shows a lock operation in a state in which the position of recess of the steering shaft is shifted from the engagement portion of the lock shaft.

FIG. 7 shows the lock operating state when the engagement portion 44 of the lock shaft 30 cannot fit into the recess portion because the position of the recess portion of the steering shaft is out of alignment. In this case, state D and state E are the same as in FIG. 6. At state F in which the engagement portion 34 of the slider 28 comes into contact with one stopper portion 27a of the cam groove 27, the rotation of the winder 26 is restricted. After that, as the electric motor 22 continues reverse rotation, the worm wheel 24 and the shaft portion 24a also continue to rotate. When the lock shaft 30 linearly further moves upward from state E, the tip end of the engagement portion 44 of the lock shaft 30 comes into contact with the outer peripheral surface between the recess portions of the steering shaft so that further upward movement is restricted. However, as the reverse drive of the electric motor 22 is continued, the winder 26 moves upward with respect to the shaft portion 24a by the screw drive, thereby causing the slider to move upward.

At this time, as the upward movement of the lock shaft is restricted, the pin 50 moves inside the elongated hole 46 of the lock shaft 30, thereby causing the lock shaft 30 to move relative to the slider 28. The quantity of the relative movement corresponds to the quantity of compression of the lock spring 52. Thus, the lock shaft 30 is in a state strongly biased in the lock direction or upward direction by the lock spring 52. After that, when the steering shaft is rotated by the operation of the steering wheel and the position of the recess portion coincides with the engagement portion 44 of the lock shaft 30, the lock shaft 30 moves upward by the biasing force of the lock spring 52 so that the engagement portion 44 fits into the recess portion, thereby causing the steering shaft to be locked. As described above, the power steering unit 10 of the present embodiment is so constituted that even if the position of the recess portion of the steering shaft is out of alignment at the time of the locking operation, the lock state is automatically completed.

Next, the operation for detecting the lock state and unlock state of the steering lock unit 10 having the constitution described above will be described.

FIG. 8(A) shows a state of the lock shaft 30 and the position block 80 when the steering shaft 1 is at the lock state. FIG. 8(B) shows a relation between the position block 80 and the detent portion 60 as in FIG. 8(A).

At the time of the lock state, the switch operating portion 40 of the slider 28 comes into contact with the lock side contact surface 84 so that the position block 80 is in a position swung in the clockwise direction. At this time, the lock protrusion 88 of the position block 80 pushes the switch piece 54a to operate it ON. On the other hand, the unlock position detecting switch 56 is OFF because the unlock protrusion 90 of the position block 80 is separated. Thus, the printed board 53 detects an ON signal from the lock position detecting switch 54 and determines that the lock shaft 30 is in the lock state based on the fact that the unlock detecting switch 56 is OFF.

Also, at the time of the lock state shown in FIG. 8(B), the steel ball 100 biased by the detent spring 98 fits in the first detent recess portion 64 of the detent portion 60 so that the position block 80 can hold a swing position in which the lock position detecting switch 54 is ON.

FIG. 9 shows a state in which the lock shaft 30 is on the way of operation from the lock position to the unlock position. For example, when a user having a normal electronic key gets in the vehicle to push the engine start switch, the electric motor 22 of the power steering lock unit 10 is powered based on a start signal from a host ECU (host electronic control unit) and rotates forwardly. Thus, the power of the electric motor 22 is transmitted via the worm gear 23 to rotate the worm wheel 24. The rotation of the worm wheel 24 causes the winder 26, meshed with the thread portion 24a, to rotate in the counterclockwise direction as viewed from above in FIG. 1 together with the worm wheel 24 or move downward. Thus, both the slider 28 of which engagement portion 34 engages with the cam groove 27 of the winder 26 and the lock shaft 30 linearly move downward with the assistance of the biasing force of the unlock spring 42 with respect to the slider 28. As a result, as shown in FIG. 9(A), the engagement portion 44 of the lock shaft 30 escapes from the recess portion 2 of the steering shaft 1 to release the engagement so that the steering shaft 1 and the steering wheel are unlocked and become rotatable.

At this time, as shown in FIG. 9(B), the switch operating portion 40 of the slider 28 leaves the lock side contact surface 84 of the position block 80 and moves downward to slightly come into contact with the unlock side contact surface 86 of the position block 80. However, it stops short of swinging the position block 80 of which swinging position is held as described above by the steel ball 100 fitted in the first detent recess portion 64. The position block 80 maintains the state of turning the lock position detecting switch 54ON. Therefore, the swinging position of the position block 80 does not change and the decision of the printed board 53 that the lock shaft 30 is in the lock position is unchanged.

As described above, the steel ball 100 and the first detent recess portion 64, in cooperation with each other, hold the state in which the position block 80 turns the lock position detecting switch 54 ON. At a position (engagement position) where the lock shaft 30 is on the way of movement from the lock position to the unlock position and does not complete the engagement release from the steering shaft 1, it is possible to continue the lock position detecting signal from the lock position detecting switch 54. That is to say, in the case that the unlock position detecting switch 56 is in trouble and is normally ON, when the lock position detecting switch 54 is turned OFF while the lock shaft 30 is in the engagement position, it is possible to enhance security by avoiding such a possible situation that the unlock state is decided to allow the engine to start or drive in spite of the fact that the steering shaft 1 is still in the lock state.

FIG. 10 shows a state in which the kick position detecting switch 54 is OFF. When the electric motor 22 is driven and the slider 28 linearly moves downward with the assistance of biasing force of the unlock spring 42, the switch operating portion 40 of the slider 28 presses the unlock side contact surface 86 of the position block, causing the position block 80 to start swinging in the counterclockwise direction. Thus, the switch piece 54a is released from pushing due to the lock projection 88 of the position block 80, thereby causing the lock position detecting switch 54 to be turned OFF. On the other hand, the unlock protrusion 90 of the position block 80 neither pushes the switch piece 56 nor turns the unlock position detecting switch 56ON. That is to say, the position block detecting switch 54 is in a neutral position that neither the lock position detecting switch 54 nor the unlock position detecting switch 56 is turned ON. At this time, the steel ball 100 provided on the position block 80 escapes from the first detent recess portion 64 and fits into the adjacent second detent recess portion 66, thereby allowing the position block 80 to be held in the neutral position.

FIG. 11 shows a state in which the lock shaft reaches the unlock position. The operation of electric motor 22 is stopped after rotating by a predetermined amount from the rotation start point. Until the operation of electric motor 22 is stopped, the slider 28 further moves downward with the assistance of the biasing force of the unlock spring 42, thereby allowing the switch operating portion 40 to press the unlock side contact surface 86 of the position block 80. Thus, the position block 80 further swings against the spring force of the return spring 72 in the counterclockwise direction from the neutral position. As a result, the unlock projection 90 of the position block 80 pushes the switch piece 56a, thereby causing the unlock position detecting switch 56 to be turned ON. At this time, the steel ball 100 provided on the position block 80 escapes from the second detent recess 66 and becomes pressed on the inclined surface 68 by the detent spring 98.

When the unlock position detecting switch 56 is turned ON, and the lock position detecting switch 54 is OFF, the printed board 53 decides that the lock shaft 30 is at the unlock position. Thus, the unlock operation of the power steering lock unit 10 is completed.

Subsequently, the lock operation of the power steering lock unit 10 will be described.

FIG. 12 shows a state in which the lock shaft 30 starts to move from the unlock position as shown in FIG. 12 toward the lock position and the unlock position detecting switch 56 is turned OFF.

For example, when a user having a normal electronic key has left the vehicle for more than a predetermined distance after stopping the engine, an upper ECU transmits a lock command to the power steering lock unit 10. The printed board 53 receives the command and reversely drives the electric motor 22. Thus, the power of the electric motor 22 is transmitted via the worm gear 23 to rotate the worm wheel 24. When the worm wheel 24 rotates, the winder 26 meshing with the thread portion 24a rotates in the clockwise direction as viewed from above in FIG. 1 together with the worm wheel 24 or moves upward. Thus, both the slider 28 of which engagement portion 34 engages with the cam groove 27 of the winder 26 and the lock shaft 30 start to linearly move upward from the unlock position toward the lock position against the biasing force of the lock spring 42 to the slider.

Upward movement of the slider causes the unlock side contact surface 86 to be released from being pushed by the switch operating portion 40. Thus, as shown in FIG. 12(B), the position block 80 swings in the clockwise direction from the state shown in FIG. 11(B) due to both a reaction force from the inclined surface 68 with which the steel ball comes into press contact and a biasing force of the return spring 72 to a neutral position in which the steel ball 100 fits into the second detent recess portion 66. At this time, the switch operating portion 40 of the slider 28 comes into slight contact with the unlock side contact surface 86. Thus, as shown in FIG. 12(A), the unlock projection 90 of the position block 80 leaves the switch piece 56a, thereby causing the unlock position detecting switch 56 to be turned OFF. As described above, when the position block 80 is at the neutral position, the lock position detecting switch 54 is in the OFF state. That is to say, this is a state in which neither an unlock signal nor a lock signal is inputted to the printed board 53.

As described above, when the position block 80 turns the unlock position detecting switch 56ON, the steel ball 100, which has escaped from the second detent recess portion 66, comes into press contact with the inclined surface 68. According to this constitution, the reaction force from the inclined surface 68, which is caused by the steel ball 100 being biased to the inclined surface 68 by the detent spring 98, acts in a direction in which the steel ball 100 is returned to the second detent recess portion 66, i.e., a direction in which the position block 80 is returned to the neutral position. Thus, when the lock shaft 30 starts to move from the unlock position toward the lock position, the position block 80 is released from the restriction due to the lock shaft 30 to return to the neutral position. As a result, the operation of the unlock position detecting switch 56 can be immediately turned OFF. The operation for immediately turning the unlock position detecting switch 56 OFF as the lock shaft 30 starts to move from the unlock position to the lock position can be surely conducted by providing the return spring 72, thereby enhancing safety.

FIG. 13 shows a state in which the lock operation further progresses and the engagement portion 44 of the lock shaft 30 begins to engage with the recess portion 2 of the steering shaft 1. When the slider 28 and the lock shaft 30 further linearly move upward due to the reverse drive of the electric motor 22, the switch operating portion 40 of the slider 28 moves until it comes into slight contact with the lock side contact surface 84 of the position block 80. At this time, because the switch operating portion 40 does not push the lock side contact surface 84, the position block 80 is still held at the neutral position:

Then, the operation of electric motor 22 is stopped after rotating by a predetermined amount from the rotation start point. Thus, the slider 28 and the lock shaft 30 further linearly moves upward. As a result, as shown in FIG. 8, the lock shaft 30 reaches the lock position. At this time, the position block 80 further swings in the clockwise direction as shown in FIG. 8(B), thereby causing the lock position detecting switch 54 to be turned ON. As a result, based on that the unlock position detecting switch 56 is OFF and the lock position detecting switch 54 is turned ON, the printed board 53 decides that the lock shaft 30 is at the lock position. Thus, the lock operation is completed.

Figure 14:
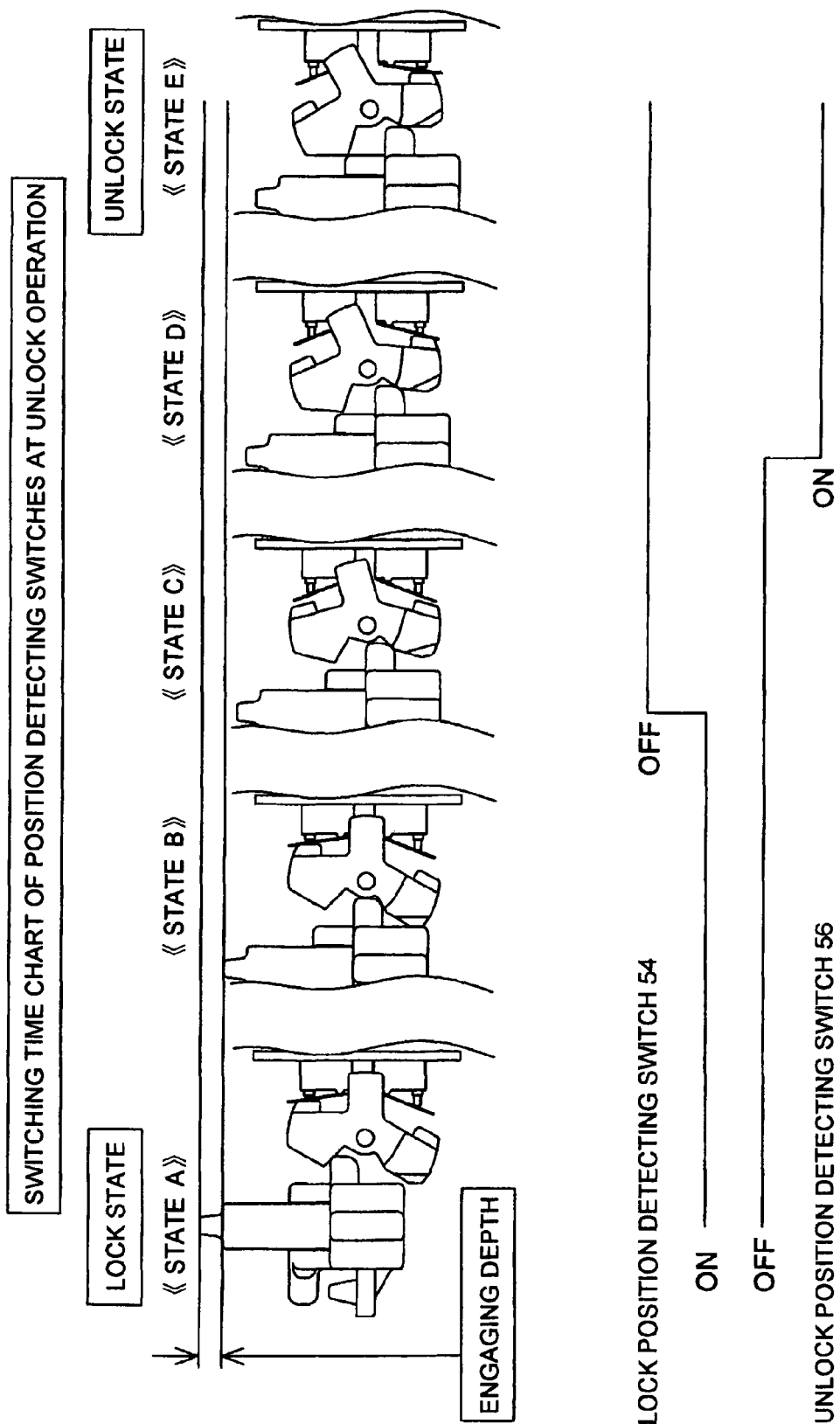
FIG. 14 shows a time chart of switching of each position detecting switch in the unlock operation.
Figure 15:
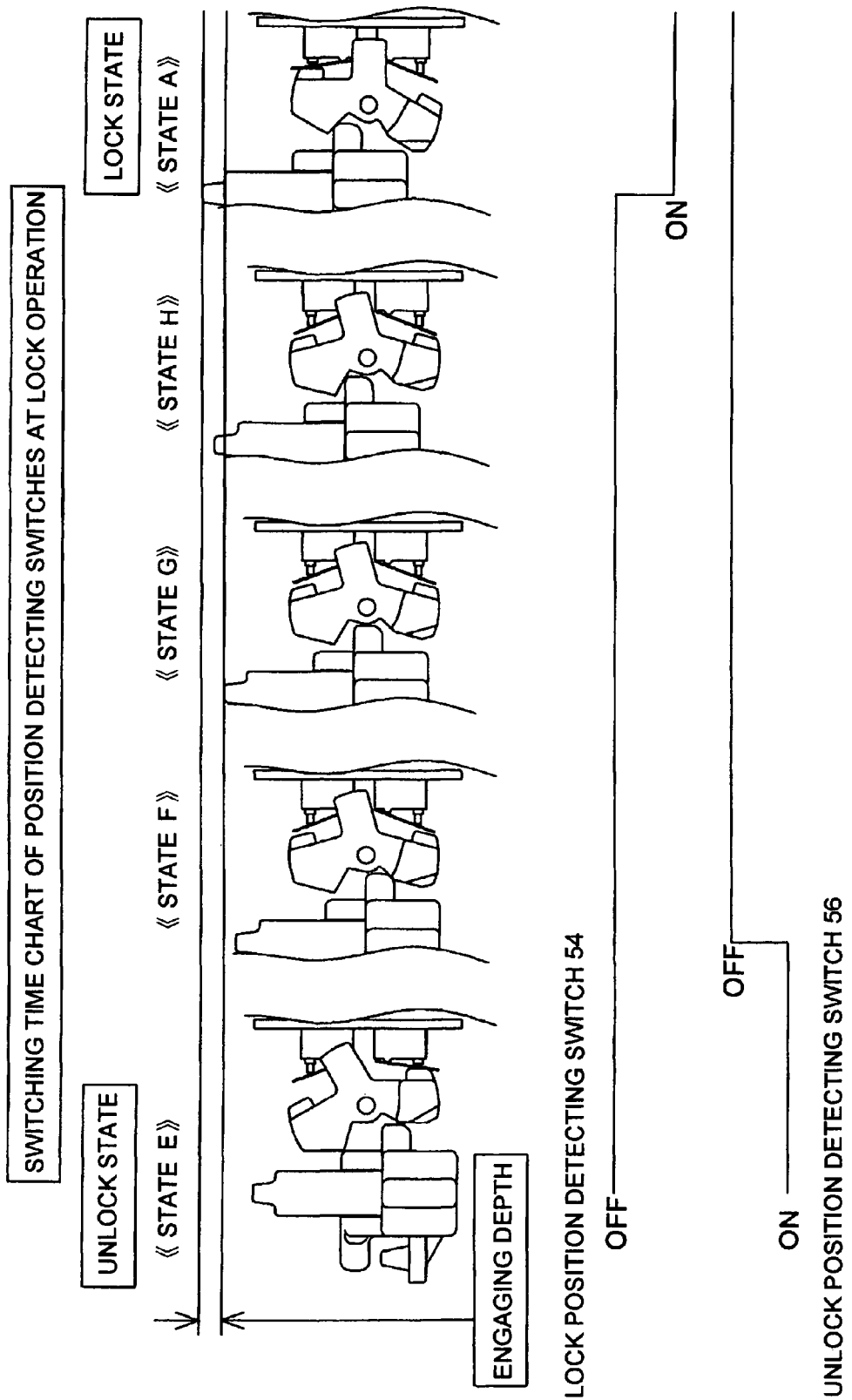
FIG. 15 shows a time chart of switching of each position detecting switch in the lock operation.

FIG. 14 shows a switching time chart of the position detecting switches 54, 56 at the unlock operation; and FIG. 15 shows a switching time chart of the position detecting switches 54, 56 at the lock operation.

In FIG. 14, a state A shows a lock state in which the engagement portion 44 of the lock shaft 30 completely fits into the recess portion 2 of the steering shaft 1; a state B shows a state in which the engagement portion 44 escapes (released from engagement) from the recess portion 2; a state C is a state in which the position block 80 swings to the neutral position and the lock position detecting switch is turned OFF; a state D shows a state in which the position block 80 swings from the neutral position to turn the unlock position detecting switch 56ON; and a state E shows an unlock state in which the unlock operation is completed.

In FIG. 15, a state E shows an unlock state (same as in FIG. 14); a state F shows a state in which the position block 80 swings to the neutral position and the unlock position detecting switch 56 is turned OFF; a state G shows a state in which the slider 28 and the lock shaft 30 moves upward but the position block 80 is held at the neutral position; a state H shows a state in which the position block 80 starts to swing from the neutral position in the clockwise direction and the engagement portion 44 of the lock shaft 30 starts to engage with the recess portion 2 of the steering shaft 1; and a state A is a lock state (same as FIG. 14) in which the lock operation is completed.

FIG. 16 shows a state in which the engagement portion 44 of the lock shaft 30 cannot engage at the time of lock operation because the engagement portion 2 of the steering shaft is out of alignment. In this case, the electric motor 22 is reversely driven by a predetermined quantity and stopped. At this time, the slider 28 moves upward by a distance corresponding to the reverse drive of the electric motor 22, thereby causing the switch operating portion 40 to turn the lock position detecting switch 54ON. However, when the tip end of the engagement portion 44 comes into contact with the outer periphery between the recess portion 2 of the steering shaft 1, the lock shaft 30 cannot move upward together with the slider 28. Therefore, the pin 50 moves inside the elongated hole 46 of the lock shaft 30, which causes the lock shaft 30 to move relative to the slider 28. The quantity of the relative movement corresponds to the quantity of compression of the lock spring 52. Thus, the lock shaft 30 is strongly biased in the lock direction or upward by the lock spring 52. After that, when the steering shaft is rotated by the operation of the steering wheel and the position of the recess portion coincides with the engagement portion 44 of the lock shaft 30, the lock shaft 30 moves upward by the biasing force of the lock spring 52 so that the engagement portion 44 fits into the recess portion, thereby causing the steering shaft to be locked. As described above, the power steering unit 10 of the present embodiment is so constituted that even if the position of the recess portion of the steering shaft is out of alignment at the time of locking operation, the lock state is automatically completed.

As described above, according to the power steering lock unit of the present embodiment, the position block 80 operates any one of the lock position detecting switch 54 and unlock position detecting switch 56 in the lock position or the unlock position of the lock shaft 30. Therefore, when any one of the position detecting switches 54, 56 is turned ON, the other is certainly turned OFF. Thus, there is no possibility that both position detecting switches 54, 56 are turned ON. Therefore, even if the constitution that the position block 80 swings as the lock shaft moves is simple and low cost, it is possible to correctly detect the lock position and the unlock position of the lock shaft 30 and also detect the failure of the position detecting switches 54, 56. As a result, it is possible to surely prevent such a situation where, in spite of the fact that engagement of the lock shaft 30 with the steering shaft 1 is not perfectly released, the unlock signal is outputted from the unlock position detecting switch 56 to start or drive the engine.

In addition, since such a construction that the linear movement of the lock shaft 30 is converted to the swing movement (i.e., angular movement in the circumference direction) of the position block 80 to turn two position detecting switches 54, 56 ON and OFF is adopted, it is possible to dispose two position detecting switches 54, 56 at an interval shorter than the distance of linear movement of the lock shaft 30 between the lock position and the unlock position regardless of the length of the lock shaft 30 in the longitudinal direction. As a result, it is possible to contribute the downsizing of the power steering lock unit.

Therefore, according to the steering lock unit 10 of the present embodiment, it is possible to accurately detect the lock state and unlock state of the steering shaft 1 with a simple and low cost constitution and surely prevent the engine from being allowed to start or drive in the lock state of the steering shaft. It is also possible to downsize the power steering lock unit 10.

Although the above embodiment is explained in connection with the power steering lock unit which conducts lock and unlock operations utilizing the electric motor, the present invention may be applied to a steering lock unit in which lock and unlock operations are manually conducted by a user (for example, insertion or rotation of mechanical key).

What is claimed is:

1. A steering lock unit comprising a lock member which holds and releases engagement with a movable member interlocked with operation of a steering wheel so that the movable member is locked and unlocked, an actuator driven by electric power supplied from a battery mounted on a vehicle, and a transmission mechanism which transmits a power of the actuator to the lock member, wherein the transmission mechanism comprises:

a shaft member which is adapted to rotate in response to the operation of the actuator; and a cam member which engages with the shaft member and transmits the operation of the actuator to the lock member, the cam member having a through hole and being a substantially cylindrical member which engages with the lock member, wherein the cam member is formed with an internal thread on an inner surface of the through hole, and the shaft member has an external thread corresponding to the internal thread of the cam member so that the cam member and the shaft member are engaged with each other and assembled, wherein when releasing the engagement of the lock member with the movable member, the shaft member and the cam member integrally rotate in a normal state, while the cam member moves in an axial direction with respect to the shaft member in a case in which a pull-out force of the lock member greater than a predetermined quantity is necessary.

2. The steering lock unit as in claim 1, wherein the cam member is formed with a cam groove on an outer surface thereof, and stopper portions are formed by first and second ends of the cam groove so that the lock member comes into contact with the stopper portions, wherein the distance that the cam member moves with respect to the shaft member, when the lock member moves between a position in contact with one stopper portion and then a position in contact with the other stopper portion, is greater than lead of the external thread on the shaft member.

3. The steering lock unit as in claim 1, wherein the shaft member is disposed parallel to a moving back-and-forth direction of the lock member.

4. The steering lock unit as in claim 1, wherein the unit further comprises:

first and second position detecting means for detecting an operating position of the lock member;

position determining means for determining the operating position of the lock member based on a detection signal from the position detecting means; and a swing member which is adapted to swing as the lock member moves to a lock position or an unlock position to allow any one of the first and second position detecting means to be operated.

5. The steering lock unit as in claim 4, wherein the swing member is housed in a switch case along with the first and second position detecting means, and the swing member is provided with a protruding member which is biased outwardly by means of a first elastic member while inside the switch case is provided a detent portion for holding the operating position of the swing member in cooperation with the protruding member.

6. The steering lock unit as in claim 5, wherein the first position detecting means is a lock position detecting switch while the second position detecting means is an unlock position detecting switch, and the detent portion is provided with a first detent recess in which the protruding member fits so that the swing member is held at a position where the lock position detecting switch is operated to ON.

7. The steering lock unit as in claim 6, wherein the detent portion is provided with a second detent recess in which the protruding member fits so that the swing member is held at a neutral position where neither the lock position detecting switch nor the unlock position detecting switch is operated to ON, and a slant surface is formed continuously to the second detent recess so that the protruding member can escape from the second detent recess and come into press contact with the slant surface when the swing member causes the unlock position detecting switch to be operated to ON.

8. The steering lock unit as in claim 7, wherein the unit further comprises a second elastic member for applying a force so as to return the swing member to a neutral position.

* * * * *

UNITED STATES PATENT AND TRADEMARK OFFICE
CERTIFICATE OF CORRECTION

PATENT NO. : 7,762,110 B2
APPLICATION NO. : 11/905596
DATED : July 27, 2010
INVENTOR(S) : Manabu Tsukazaki It is certified that error appears in the above-identified patent and that said Letters Patent is hereby corrected as shown below:

In the Specification

In column 15, line 29, "540N" should read --54 ON--.

In column 15, line 50, "kick" should read --lock--.

In column 15, line 62, "560N" should read --56 ON--.

In column 16, line 64, "560N" should read --56 ON--.

In column 17, line 25, "position:" should read --position.--.

In column 17, line 51, "560N" should read --56 ON--.

In column 18, line 6, "540N" should read --54 ON--.

Signed and Sealed this

Thirtieth Day of November, 2010

David J. Kappos
*Director of the United States Patent and Trademark Office*